United States Patent
Ayrapetian et al.

(10) Patent No.: US 10,522,167 B1
(45) Date of Patent: Dec. 31, 2019

(54) MULTICHANNEL NOISE CANCELLATION USING DEEP NEURAL NETWORK MASKING

(71) Applicant: Amazon Technologies, Inc., Seattle, WA (US)

(72) Inventors: Robert Ayrapetian, Morgan Hill, CA (US); Philip Ryan Hilmes, Sunnyvale, CA (US); Trausti Thor Kristjansson, San Jose, CA (US)

(73) Assignee: AMAZON TECHONLOGIES, INC., Seattle, WA (US)

( * ) Notice: Subject to any disclaimer, the term of this patent is extended or adjusted under 35 U.S.C. 154(b) by 0 days.

(21) Appl. No.: 15/895,313

(22) Filed: Feb. 13, 2018

(51) Int. Cl.
| | |
|---|---|
| *G10L 21/0216* | (2013.01) |
| *G10L 21/0264* | (2013.01) |
| *G10L 25/30* | (2013.01) |
| *G10L 17/18* | (2013.01) |
| G10L 21/0208 | (2013.01) |

(52) U.S. Cl.
CPC .......... *G10L 21/0216* (2013.01); *G10L 17/18* (2013.01); *G10L 21/0264* (2013.01); *G10L 25/30* (2013.01); G10L 2021/02087 (2013.01); G10L 2021/02166 (2013.01)

(58) Field of Classification Search
CPC ... A61B 7/04; G01S 7/023; G01S 7/02; G06F 3/167; G06F 17/505; G06F 3/16; G06F 17/50; G06N 3/08; G10K 11/178; G10K 11/16; G10L 13/027; G10L 15/005; G10L 15/16; G10L 15/20; G10L 15/22; G10L 15/26; G10L 15/28; G10L 17/18; G10L 19/008; G10L 19/22; G10L 2021/02166; G10L 21/0208; G10L 21/0216; G10L 21/0232; G10L 25/30; G10L 15/06; G10L 2021/02087; G10L 21/013; G10L 21/0264; G10L 25/18; G10L 25/78; G10L 15/00; G10L 21/00; G10L 25/00; H04R 1/406; H04R 3/005; H04R 3/00; H04R 1/40; H04W 4/025; H04W 4/02; G10H 1/36

USPC ........ 244/1; 370/290, 286; 381/74, 94.1, 17, 381/58, 71.1, 71.11, 92, 94.7, 98, 122, 381/66; 704/202, 226, 233; 348/14.08;

(Continued)

(56) References Cited

U.S. PATENT DOCUMENTS 5,323,459 A * 6/1994 Hirano ................... H04M 9/082
  370/290
5,371,789 A * 12/1994 Hirano ................... H04M 9/082
  370/290

(Continued)

*Primary Examiner* — Gerald Gauthier
(74) *Attorney, Agent, or Firm* — Pierce Atwood LLP

(57) ABSTRACT

A system configured to improve beamforming by using deep neural networks (DNNs). The system can use one trained DNN to focus on a first person speaking an utterance (e.g., target user) and one or more trained DNNs to focus on noise source(s) (e.g., wireless loudspeaker(s), a second person speaking, other localized sources of noise, or the like). The DNNs may generate time-frequency mask data that indicates individual frequency bands that correspond to the particular source detected by the DNN. Using this mask data, a beamformer can generate beamformed audio data that is specific to a source of noise. The system may perform noise cancellation to isolate first beamformed audio data associated with the target user by removing second beamformed audio data associated with noise source(s).

20 Claims, 16 Drawing Sheets

(58) Field of Classification Search
USPC ...... 455/501, 570; 700/94; 379/391, 406.01, 379/406.08
See application file for complete search history.

(56) References Cited

U.S. PATENT DOCUMENTS

| | | | | |
|---|---|---|---|---|
| 5,396,554 A * | 3/1995 | Hirano | ................ | H04M 9/082 370/290 |
| 5,513,265 A * | 4/1996 | Hirano | ................ | G10K 11/178 379/406.01 |
| 5,621,724 A * | 4/1997 | Yoshida | ................ | H04M 9/082 370/290 |
| 5,661,813 A * | 8/1997 | Shimauchi | ............ | H04M 9/082 381/66 |
| 5,761,318 A * | 6/1998 | Shimauchi | ............ | H04M 9/082 379/406.05 |
| 5,856,970 A * | 1/1999 | Gee | .................... | H03H 21/0012 370/286 |
| 6,404,886 B1 * | 6/2002 | Yoshida | ................ | H04M 9/082 379/406.01 |
| 6,577,731 B1 * | 6/2003 | Sugiyama | .......... | H03H 21/0012 379/406.01 |
| 6,700,977 B2 * | 3/2004 | Sugiyama | ............ | H04M 9/082 379/406.01 |
| 7,443,989 B2 * | 10/2008 | Choi | .................. | G10L 21/0208 381/92 |
| 8,189,765 B2 * | 5/2012 | Nishikawa | ............ | H04M 9/082 379/406.01 |
| 8,385,557 B2 * | 2/2013 | Tashev | ................ | H04M 9/082 379/406.01 |
| 9,008,327 B2 * | 4/2015 | Triki | ........................ | H04R 3/02 381/71.1 |
| 9,123,324 B2 * | 9/2015 | Volcker | ................ | G10K 11/175 |
| 9,215,527 B1 * | 12/2015 | Saric | ...................... | H04R 3/005 |
| 9,412,354 B1 * | 8/2016 | Ramprashad | .......... | H04R 3/005 |
| 9,554,208 B1 * | 1/2017 | Jain | ........................ | H04R 3/005 |
| 9,734,824 B2 * | 8/2017 | Penn | .................... | G10L 15/16 |
| 9,922,664 B2 * | 3/2018 | Sharma | ................ | G10L 15/065 |
| 9,966,059 B1 * | 5/2018 | Ayrapetian | ............ | G10K 11/346 |
| 9,967,661 B1 * | 5/2018 | Hilmes | ............... | G10L 21/0272 |
| 9,972,339 B1 * | 5/2018 | Sundaram | .............. | G10L 17/04 |
| 10,051,366 B1 * | 8/2018 | Buoni | ................. | H04R 29/005 |
| 10,140,980 B2 * | 11/2018 | Bengio | ................... | G10L 15/16 |
| 10,325,615 B2 * | 6/2019 | Koretzky | ............ | G06F 3/04847 |
| 2002/0193130 A1 * | 12/2002 | Yang | .................... | H04R 3/005 455/501 |
| 2004/0001137 A1 * | 1/2004 | Cutler | .................. | H04N 5/2259 348/14.08 |
| 2006/0222184 A1 * | 10/2006 | Buck | ................... | G10L 21/0208 381/71.1 |
| 2007/0081677 A1 * | 4/2007 | Nishikawa | ........... | G10K 11/341 381/98 |
| 2007/0258578 A1 * | 11/2007 | Hirai | .................... | H04M 9/082 379/406.01 |
| 2008/0232607 A1 * | 9/2008 | Tashev | ..................... | G01S 3/86 381/71.11 |
| 2009/0034752 A1 * | 2/2009 | Zhang | .................... | H04R 3/005 381/92 |
| 2009/0055170 A1 * | 2/2009 | Nagahama | .............. | G10L 15/20 704/226 |
| 2009/0304203 A1 * | 12/2009 | Haykin | .................... | G10L 21/02 381/94.1 |
| 2010/0056227 A1 * | 3/2010 | Hayakawa | .......... | G10L 21/0208 455/570 |
| 2011/0044460 A1 * | 2/2011 | Rung | .................. | G10L 21/0208 381/58 |
| 2011/0160883 A1 * | 6/2011 | Yasuda | .................... | H04R 3/14 700/94 |
| 2012/0099732 A1 * | 4/2012 | Visser | ................ | G10L 21/0272 381/17 |
| 2013/0272548 A1 * | 10/2013 | Visser | ................ | G06K 9/00624 381/122 |
| 2014/0126746 A1 * | 5/2014 | Shin | ........................ | G10L 21/028 381/94.7 |
| 2014/0328490 A1 * | 11/2014 | Mohammad | .......... | H04M 9/082 381/66 |
| 2014/0343935 A1 * | 11/2014 | Jung | ....................... | G10L 15/20 704/233 |
| 2015/0010158 A1 * | 1/2015 | Broadley | ............... | H04R 29/00 381/58 |
| 2015/0063579 A1 * | 3/2015 | Bao | ........................ | H04M 9/082 381/66 |
| 2015/0066499 A1 * | 3/2015 | Wang | ....................... | G10L 25/30 704/233 |
| 2015/0172807 A1 * | 6/2015 | Olsson | ................. | G10K 11/175 381/74 |
| 2016/0078880 A1 * | 3/2016 | Avendano | ............... | G10L 21/02 704/202 |
| 2016/0111109 A1 * | 4/2016 | Tsujikawa | .............. | H04R 3/005 704/226 |
| 2016/0295322 A1 * | 10/2016 | Orescanin | .............. | H04R 3/005 |
| 2016/0322055 A1 * | 11/2016 | Sainath | ................. | G10L 15/16 |
| 2016/0358606 A1 * | 12/2016 | Ramprashad | .......... | G10L 15/32 |
| 2017/0011734 A1 * | 1/2017 | Ganapathy | ............ | G10L 15/005 |
| 2017/0032802 A1 * | 2/2017 | Senior | .................... | G10L 15/16 |
| 2017/0061978 A1 * | 3/2017 | Wang | ................... | G10L 21/0232 |
| 2017/0070815 A1 * | 3/2017 | Mitsufuji | ............... | H04R 1/406 |
| 2017/0092297 A1 * | 3/2017 | Sainath | .................... | G10L 25/78 |
| 2017/0140268 A1 * | 5/2017 | van Hasselt | ............ | G06N 3/08 |
| 2017/0162194 A1 * | 6/2017 | Nesta | ...................... | G10L 25/30 |
| 2017/0278513 A1 * | 9/2017 | Li | ........................ | G10L 15/16 |
| 2017/0323653 A1 * | 11/2017 | Hassan al Banna | .... | G10L 15/20 |
| 2017/0330586 A1 * | 11/2017 | Roblek | ............... | G06F 11/0715 |
| 2017/0353789 A1 * | 12/2017 | Kim | ........................ | H04R 3/005 |
| 2018/0090138 A1 * | 3/2018 | Finn | ....................... | G10L 15/22 |
| 2018/0122403 A1 * | 5/2018 | Koretzky | ............ | G10L 21/0272 |
| 2018/0132815 A1 * | 5/2018 | Tsai | ........................ | H04R 29/006 |
| 2018/0149730 A1 * | 5/2018 | Li | .......................... | G01S 13/343 |
| 2018/0197557 A1 * | 7/2018 | Guo | ........................ | G10L 19/00 |
| 2018/0233127 A1 * | 8/2018 | Visser | .................... | G10L 13/047 |
| 2018/0247642 A1 * | 8/2018 | Kim | ....................... | G10L 15/16 |
| 2018/0261225 A1 * | 9/2018 | Watanabe | ............... | G10L 15/16 |
| 2018/0277099 A1 * | 9/2018 | Zou | ........................ | G10L 15/063 |
| 2018/0293969 A1 * | 10/2018 | Zhao | ....................... | G10H 1/36 |

\* cited by examiner

Target Speech Mask Data 510

Noise Mask Data 512

Target Speech Mask Data 520

Non-Target Speech Mask Data 522

Noise Mask Data 524

Target Speech Mask Data 530

Noise Mask Data 532

Target Speech Mask Data 540

Non-Target Speech Mask Data 542

Noise Mask Data 544

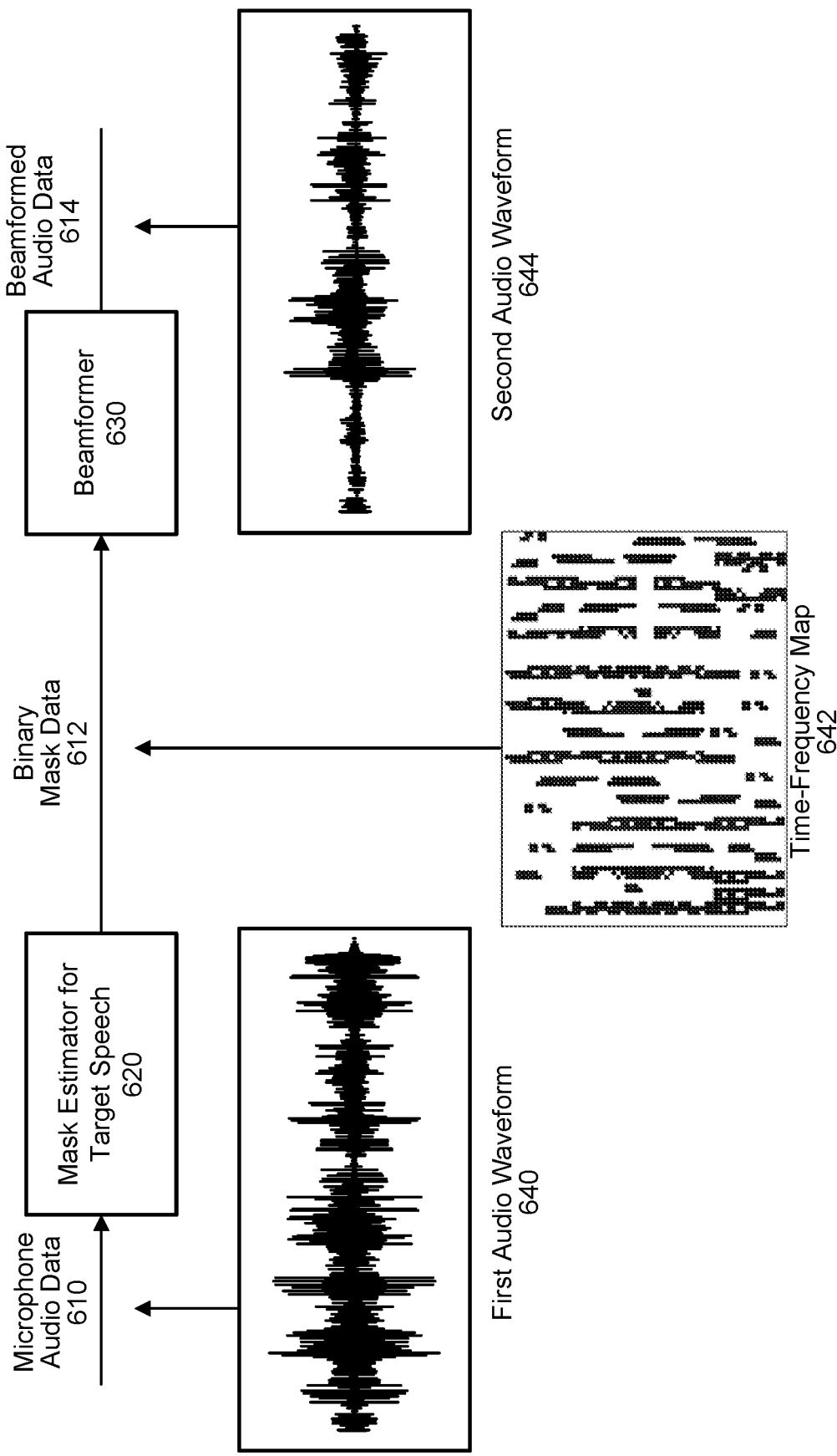

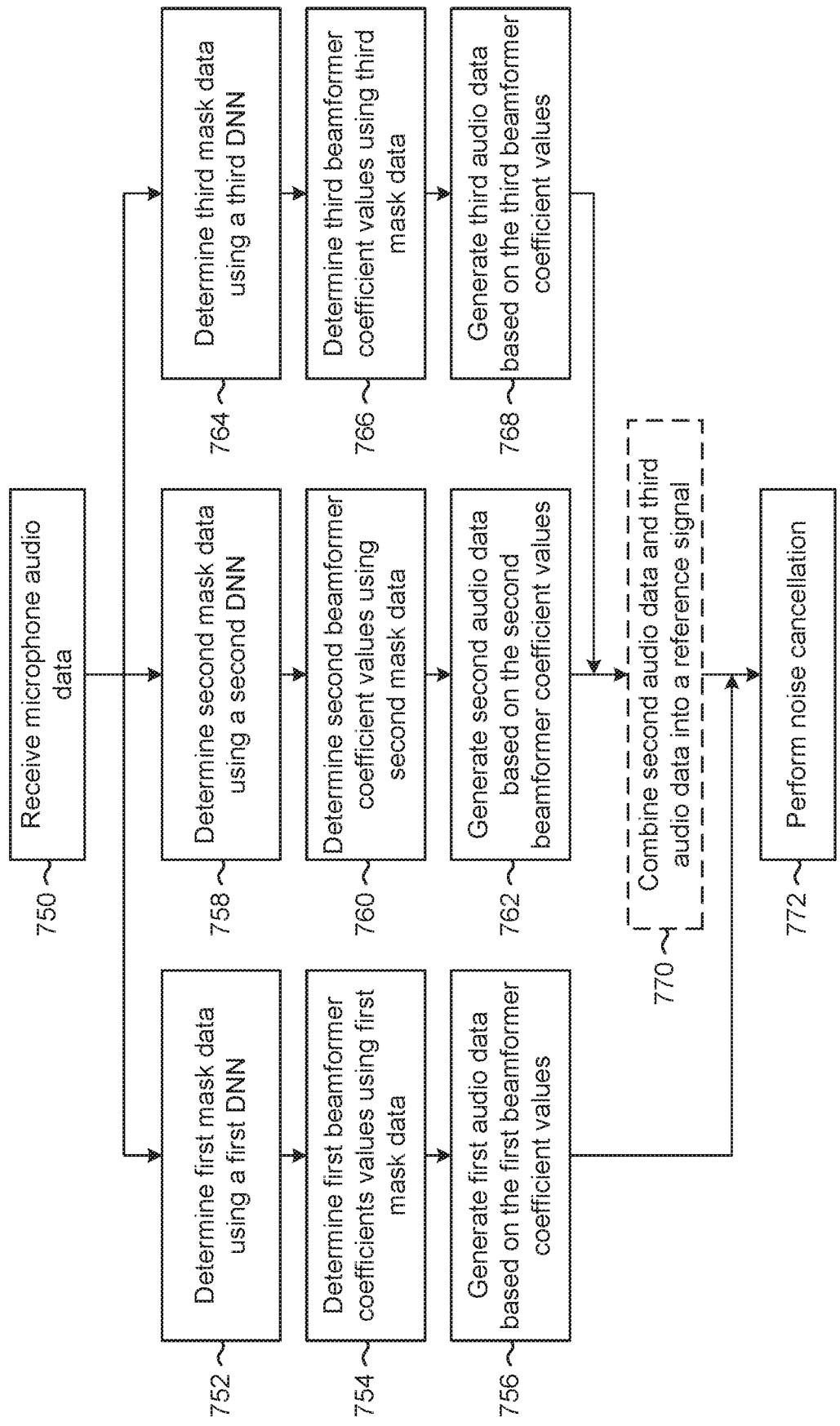

MULTICHANNEL NOISE CANCELLATION USING DEEP NEURAL NETWORK MASKING

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 6 illustrates an example of audio data input to a DNN and audio data output from a beamformer according to examples of the present disclosure.

FIGS. 7A-7B are flowcharts conceptually illustrating example methods for performing beamforming using multiple DNNs according to examples of the present disclosure.

DETAILED DESCRIPTION

Figure 1:
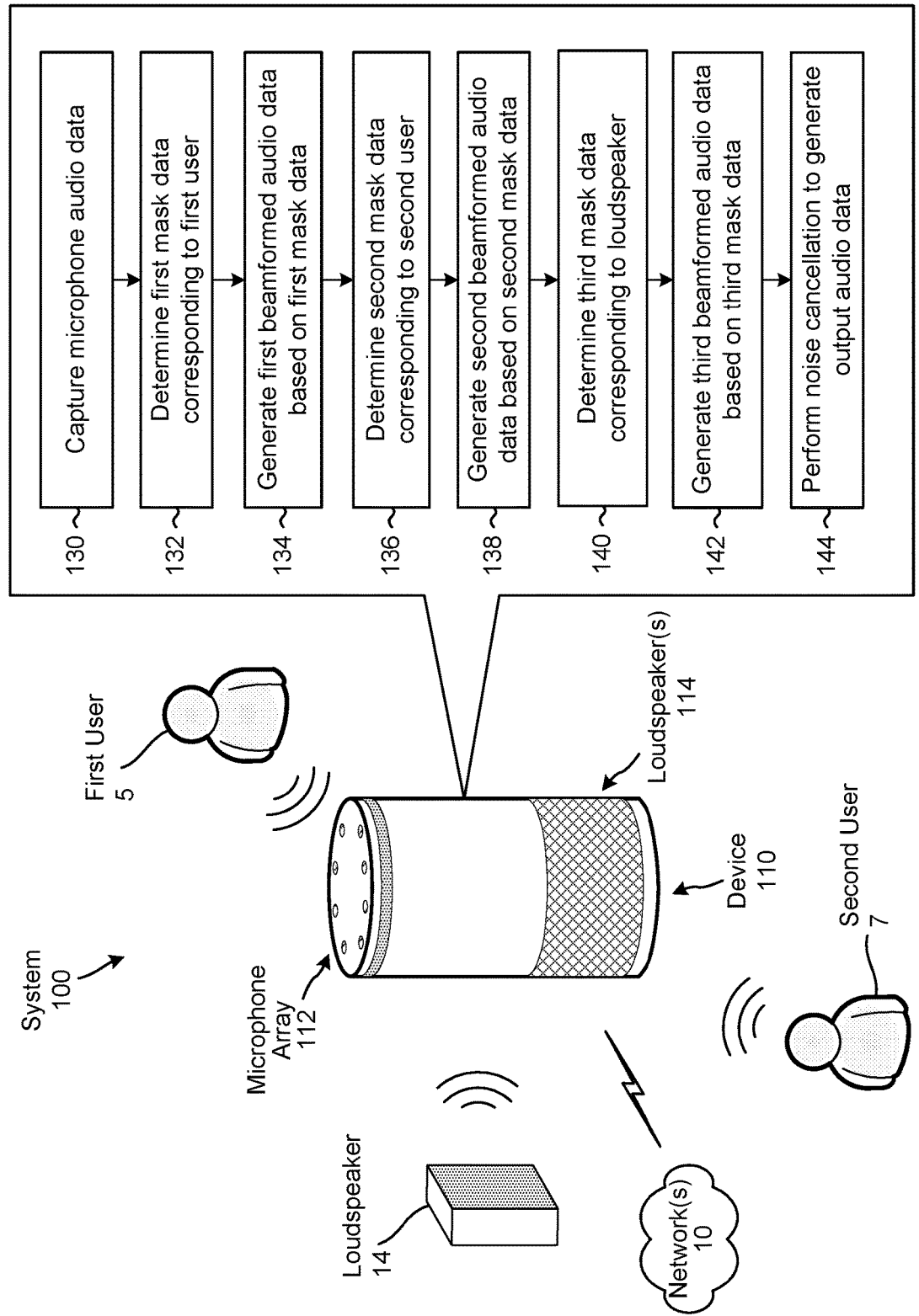
FIG. 1 illustrates a system according to embodiments of the present disclosure.

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. An electronic device may perform acoustic echo cancellation to remove, from the audio data, an "echo" signal corresponding to the audio generated by the loudspeaker(s), thus isolating the desired speech to be used for voice commands and/or the communication session from whatever other audio may exist in the environment of the user.

However, some techniques for acoustic echo cancellation can only be performed when the device knows the reference audio data being sent to the loudspeaker, and therefore these techniques cannot remove undesired speech, ambient noise and/or echo signals from loudspeakers not controlled by the device. Other techniques for acoustic echo cancellation solve this problem by estimating the noise (e.g., undesired speech, echo signal from the loudspeaker, and/or ambient noise) based on the audio data captured by a microphone array. For example, these techniques may include fixed beamformers that beamform the audio data (e.g., separate the audio data into portions that corresponds to individual directions) and then perform the acoustic echo cancellation using a target signal associated with one direction and a reference signal associated with a different direction (or all remaining directions). However, while the fixed beamformers enable the acoustic echo cancellation to remove noise associated with a distributed source (e.g., audio is reflected such that directionality is lost and the audio appears to be coming from everywhere), these techniques do not adequately remove noise associated with localized sources, such as a wireless speaker or a second person speaking.

To improve beamforming and/or noise cancellation, devices, systems and methods are disclosed that include deep neural networks (DNNs). For example, the system can use one trained DNN to focus on a first person speaking an utterance (e.g., target user) and one or more trained DNNs to focus on noise source(s) (e.g., wireless loudspeaker(s), a second person speaking, other localized sources of noise, or the like). The DNNs may generate time-frequency mask data that indicates individual frequency bands that correspond to the particular source detected by the DNN. Using this mask data, a beamformer can generate beamformed audio data that is specific to the source of noise. The system may perform noise cancellation to isolate first beamformed audio data associated with the target user by removing second beamformed audio data associated with noise source(s).

FIG. 1 illustrates a high-level conceptual block diagram of a system 100 configured to perform beamforming using deep neural networks (DNNs). Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 10 and that may include a microphone array 112 and loudspeaker(s) 114. Using the microphone array 112, the device 110 may capture audio data that includes a representation of first speech from a first user 5, a representation of second speech from a second user 7, a representation of audible sound output by a loudspeaker 14, and a representation of ambient noise in an environment around the device 110.

The device 110 may be an electronic device configured to capture, process and send audio data to remote devices. For ease of illustration, some audio data may be referred to as a signal, such as a playback signal x(t), an echo signal y(t), an echo estimate signal y'(t), a microphone signal z(t), an error signal m(t), or the like. However, the signals may be comprised of audio data and may be referred to as audio data (e.g., playback audio data x(t), echo audio data y(t), echo estimate audio data y'(t), microphone audio data z(t), error audio data m(t), etc.) without departing from the disclosure. As used herein, audio data (e.g., playback audio data, microphone audio data, or the like) may correspond to a specific range of frequency bands. For example, the playback audio data and/or the microphone audio data may correspond to a human hearing range (e.g., 20 Hz-20 kHz), although the disclosure is not limited thereto.

The device 110 may include one or more microphone(s) in the microphone array 112 and/or one or more loudspeaker(s) 114, although the disclosure is not limited thereto and the device 110 may include additional components without departing from the disclosure. For ease of explanation, the microphones in the microphone array 112 may be referred to as microphone(s) 112 without departing from the disclosure.

In some examples, the device 110 may be communicatively coupled to the loudspeaker 14 and may send audio data to the loudspeaker 14 for playback. However, the disclosure is not limited thereto and the loudspeaker 14 may receive audio data from other devices without departing from the disclosure. While FIG. 1 illustrates the microphone array 112 capturing audible sound from the loudspeaker 14, this is intended for illustrative purposes only and the techniques disclosed herein may be applied to any source of audible sound without departing from the disclosure. For example, the microphone array 112 may capture audible sound generated by a device that includes the loudspeaker 14 (e.g., a television) or from other sources of noise (e.g., mechanical devices such as a washing machine, microwave, vacuum, etc.). Additionally or alternatively, while FIG. 1 illustrates a single loudspeaker 14, the disclosure is not limited thereto and the microphone array 112 may capture audio data from multiple loudspeakers 14 and/or multiple sources of noise without departing from the disclosure. However, the techniques described herein are configured to remove echo and/or noise generated at a distance from the device 110. Therefore, the device 110 would implement different techniques to remove echo from audio generated by the loudspeaker(s) 114 if the loudspeaker(s) 114 are internal to the device 110.

The first user 5 may control the device 110 using voice commands and/or may use the device 110 for a communication session with a remote device (not shown). In some examples, the device 110 may send microphone audio data to the remote device as part of a Voice over Internet Protocol (VoIP) communication session. For example, the device 110 may send the microphone audio data to the remote device either directly or via remote server(s) (not shown). However, the disclosure is not limited thereto and in some examples, the device 110 may send the microphone audio data to the remote server(s) in order for the remote server(s) to determine a voice command. For example, the microphone audio data may include a voice command to control the device 110 and the device 110 may send the microphone audio data to the remote server(s), the remote server(s) 120 may determine the voice command represented in the microphone audio data and perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like without departing from the disclosure.

Prior to sending the microphone audio data to the remote device and/or the remote server(s), the device 110 may perform acoustic echo cancellation (AEC) and/or residual echo suppression (RES) to isolate local speech captured by the microphone(s) 112 and/or to suppress unwanted audio data (e.g., undesired speech, echoes and/or ambient noise). For example, the device 110 may be configured to isolate the first speech associated with the first user 5 and ignore the second speech associated with the second user, the audible sound generated by the loudspeaker 14 and/or the ambient noise. Thus, AEC refers to the process of isolating the first speech and removing ambient noise and/or acoustic interference from the microphone audio data.

To illustrate an example, the device 110 may send playback audio data x(t) to the loudspeaker 14 and the loudspeaker 14 may generate playback audio (e.g., audible sound) based on the playback audio data x(t). A portion of the playback audio captured by the microphone array 112 may be referred to as an "echo," and therefore a representation of at least the portion of the playback audio may be referred to as echo audio data y(t). Using the microphone array 112, the device 110 may capture input audio as microphone audio data z(t), which may include a representation of the first speech from the first user 5 (e.g., first speech $s_1(t)$, which may be referred to as target speech), a representation of the second speech from the second user 7 (e.g., second speech $s_2(t)$, which may be referred to as distractor speech or non-target speech), a representation of the ambient noise in the environment around the device 110 (e.g., noise n(t)), and a representation of at least the portion of the playback audio (e.g., echo audio data y(t)). Thus, the microphone audio data may be illustrated using the following equation:

$$z(t)=s_1(t)+s_2(t)+y(t)+n(t) \quad [1]$$

To isolate the first speech $s_1(t)$ (e.g., target speech), the device 110 may attempt to remove the echo audio data y(t) from the microphone audio data z(t). However, as the device 110 cannot determine the echo audio data y(t) itself, the device 110 instead generates echo estimate audio data y'(t) that corresponds to the echo audio data y(t). Thus, when the device 110 removes the echo estimate signal y'(t) from the microphone signal z(t), the device 110 is removing at least a portion of the echo signal y(t). The device 110 may remove the echo estimate audio data y'(t), the second speech $s_2(t)$, and/or the noise n(t) from the microphone audio data z(t) to generate an error signal m(t), which roughly corresponds to the first speech $s_1(t)$.

A typical Acoustic Echo Canceller (AEC) estimates the echo estimate audio data y'(t) based on the playback audio data x(t), and may not be configured to remove the second speech $s_2(t)$ (e.g., distractor speech) and/or the noise n(t). In addition, if the device 110 does not send the playback audio data x(t) to the loudspeaker 14, the typical AEC may not be configured to estimate or remove the echo estimate audio data y'(t).

To improve performance of the typical AEC, and to remove the echo when the loudspeaker 14 is not controlled by the device 110, an AEC may be implemented using a fixed beamformer and may generate the echo estimate audio data y'(t) based on a portion of the microphone audio data z(t). For example, the fixed beamformer may separate the microphone audio data z(t) into distinct beamformed audio data associated with fixed directions (e.g., first beamformed audio data corresponding to a first direction, second beamformed audio data corresponding to a second direction, etc.), and the AEC may use a first portion (e.g., first beamformed audio data, which correspond to the first direction associated with the first user 5) as a target signal and a second portion (e.g., second beamformed audio data, third beamformed audio data, and/or remaining portions) as a reference signal. Thus, the AEC may generate the echo estimate audio data y'(t) from the reference signal and remove the echo estimate audio data y'(t) from the target signal. As this technique is capable of removing portions of the echo estimate audio data y'(t), the second speech $s_2(t)$, and/or the noise n(t), this may be referred to as an Acoustic Interference Canceller (AIC) instead of an AEC.

While the AIC implemented with beamforming is capable of removing acoustic interference associated with a distributed source (e.g., ambient environmental noise, reflections of the echo, etc., for which directionality is lost), performance suffers when attempting to remove acoustic interference associated with a localized source such as a wireless loudspeaker (e.g., loudspeaker 14).

To improve noise cancellation, the system 100 of the present invention is configured to use deep neural networks to perform beamforming. For example, the device 110 may include a first DNN configured to locate and track desired speech (e.g., first speech $s_1(t)$) and a second DNN configured to locate and track a noise source (e.g., playback audio generated by the loudspeaker 14, second speech $s_2(t)$ from the second user 7, other localized sources, etc.). The first DNN may generate first mask data corresponding to individual frequency bands associated with the desired speech. The device 110 may use the first mask data to generate a first vector corresponding to a first direction associated with the first user 5. The first mask data and/or the first vector may be used by a first beamformer to generate first beamformed audio data corresponding to the first direction.

Similarly, the second DNN may generate second mask data corresponding to individual frequency bands associated with the noise and the device 110 may use the second mask data to generate a second vector corresponding to a second direction associated with the noise source. The second mask data and/or the second vector may be used by a second beamformer to generate second beamformed audio data corresponding to the second direction.

For ease of illustration, the disclosure illustrates a separate DNN tracking each type of audio category. For example, the first DNN is configured to locate and track desired speech (e.g., first audio category), the second DNN is configured to locate and track a noise source (e.g., second audio category), a third DNN may be configured to locate and track undesired speech (e.g., third audio category), a fourth DNN may be configured to locate and track music (e.g., fourth audio category), etc. Each DNN may be trained individually, although the disclosure is not limited thereto. However, the disclosure is not limited to multiple DNNs and the multiple DNNs may correspond to a single DNN that is configured to track multiple audio categories without departing from the disclosure. For example, a single DNN may be configured to locate and track the desired speech (e.g., generate a first binary mask corresponding to the first audio category) while also locating and tracking the noise source (e.g., generate a second binary mask corresponding to the second audio category). In some examples, a single DNN may be configured to generate three or more binary masks corresponding to three or more audio categories without departing from the disclosure. Additionally or alternatively, a single DNN may be configured to group audio data into different categories and tag or label the audio data accordingly. For example, the DNN may classify the audio data as first speech, second speech, music, noise, etc.

As used herein, "noise" may refer to any undesired audio data separate from the desired speech (e.g., first speech $s_1(t)$). Thus, noise may refer to the second speech $s_2(t)$, the playback audio generated by the loudspeaker 14, ambient noise in the environment around the device 110, and/or other sources of audible sounds that may distract from the desired speech. Therefore, "noise cancellation" refers to a process of removing the undesired audio data to isolate the desired speech. This process is similar to acoustic echo cancellation and/or acoustic interference cancellation, and noise is intended to be broad enough to include echoes and interference. For example, the device 110 may perform noise cancellation using the first beamformed audio data as a target signal and the second beamformed audio data as a reference signal (e.g., remove the second beamformed audio data from the first beamformed audio data to generate output audio data corresponding to the first speech $s_1(t)$).

In some examples, the device 110 may include two or more DNNs configured to locate and track noise sources, with each individual DNN configured to detect a particular source of noise. For example, a first DNN may be configured to detect desired speech associated with the first user 5 (e.g., first speech $s_1(t)$, which may be referred to as target speech), a second DNN may be configured to detect undesired speech associated with the second user 7 (e.g., second speech $s_2(t)$, which may be referred to as distractor speech or non-target speech), and a third DNN may be configured to detect noise (e.g., playback audio generated by the loudspeaker 14, ambient noise in an environment around the device 110, other localized sources, etc.).

As discussed above, the first DNN may generate first mask data corresponding to individual frequency bands associated with the desired speech (e.g., first speech $s_1(t)$). The device 110 may use the first mask data to generate a first vector corresponding to a first direction associated with the first user 5. The first mask data and/or the first vector may be used by a first beamformer to generate first beamformed audio data corresponding to the first direction.

Similarly, the second DNN may generate second mask data corresponding to individual frequency bands associated with the undesired (non-target) speech (e.g., second speech $s_2(t)$) and the device 110 may use the second mask data to generate a second vector corresponding to a second direction associated with the second user 7. The second mask data and/or the second vector may be used by a second beamformer to generate second beamformed audio data corresponding to the second direction.

In addition, the third DNN may generate third mask data corresponding to individual frequency bands associated with the noise (e.g., playback audio generated by the loudspeaker 14) and the device 110 may use the third mask data to generate a third vector corresponding to a third direction associated with the loudspeaker 14. The third mask data and/or the third vector may be used by a third beamformer to generate third beamformed audio data corresponding to the third direction.

The device 110 may perform noise cancellation using the first beamformed audio data as a target signal and both the second beamformed audio data and the third beamformed audio data as reference signals (e.g., remove the second beamformed audio data and the third beamformed audio data from the first beamformed audio data to generate output audio data corresponding to the first speech $s_1(t)$).

The DNNs are configured to not only locate the desired speech and/or the noise sources at a particular moment in time, they are capable of tracking the desired speech and/or the noise source over time. For example, as the first user 5 walks around the device 110, the first DNN may track a location of the first user 5 and update the first beamformer with a current location of the first user 5. Similarly, as the second user 7 moves around the device 110, the second DNN may track a location of the second user 7 and update the second beamformer with the current location of the second user 7. Thus, even when the first user 5 and the second user 7 are in proximity to each other (e.g., standing next to each other several feet away from the device 110), the device 110 may distinguish between the first speech $s_1(t)$ and the second speech $s_2(t)$.

In order to generate the mask data, the device 110 may divide the digitized audio data into frames representing time intervals and may separate the frames into separate frequency bands. The device 110 may determine a number of values, called features, representing the qualities of the audio data, along with a set of those values, called a feature vector or audio feature vector, representing the features/qualities of the audio data within the frame for a particular frequency band. In some examples, the DNNs may generate the mask data based on the features vectors. Many different features may be determined, as known in the art, and each feature represents some quality of the audio that may be useful for the DNN to generate the mask data. A number of approaches may be used by the device 110 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

In some examples, the device 110 may process the audio data using one or more DNNs and receive one or more binary masks as output from the one or more DNNs. Thus, the DNNs may process the audio data and determine the feature vectors used to generate the one or more binary masks. However, the disclosure is not limited thereto and in other examples the device 110 may determine the feature vectors from the audio data, process the feature vectors using the one or more DNNs, and receive the one or more binary masks as output from the one or more DNNs. For example, the device 110 may perform a short-time Fourier transform (STFT) to the audio data to generate STFT coefficients and may input the STFT coefficients to the one or more DNNs as a time-frequency feature map. In some examples, the device 110 may stack STFT coefficients corresponding to two or more audio channels as the feature map (e.g., stack two-channel STFT coefficients).

In addition to the STFT coefficients, the device 110 may determine cross-channel features to improve the feature map. For example, the device 110 may determine cross-channel features such as phase differences (e.g., phase differences between two channels in the example using two-channel STFT coefficients) and cross-power spectral density (CPSD) matrices (e.g., real and imaginary components of a CPSD between the two channels). As phase differences between microphones encode directionality of a source, the phase differences are useful for separating sources from different directions. In addition, since the imaginary component of the ideal diffuse noise CPSD is always close to zero, the imaginary component of the CPSD matrices tends to have larger values at speech-dominant time-frequency units (e.g., a first time-frequency unit corresponds to a first time interval and a first frequency band). Therefore, the CPSD based cross-channel features are useful for separating speech from diffuse noise.

The binary masks may correspond to binary flags for each of the time-frequency units, with a first binary value indicating that the time-frequency unit corresponds to the detected audio category (e.g., speech, music, noise, etc.) and a second binary value indicating that the time-frequency unit does not correspond to the detected audio category. For example, a first DNN may be associated with a first audio category (e.g., target speech), a second DNN may be associated with a second audio category (e.g., non-target or distractor speech), a third DNN may be associated with a third audio category (e.g., music), and a fourth DNN may be associated with a fourth audio category (e.g., noise). Each of the DNNs may generate a binary mask based on the corresponding audio category. Thus, the first DNN may generate a first binary mask that classifies each time-frequency unit as either being associated with the target speech or not associated with the target speech (e.g., associated with at least one of the distractor speech, music, or noise). Similarly, the second DNN may generate a second binary mask that classifies each time-frequency unit as either being associated with the distractor speech or not associated with the distractor speech (e.g., associated with at least one of the target speech, music, or noise). The third DNN may generate a third binary mask that classifies each time-frequency unit as either being associated with the music or not associated with the music (e.g., associated with at least one of the target speech, distractor speech, or noise). Finally, the fourth DNN may generate a fourth binary mask that classifies each time-frequency unit as either being associated with the noise or not associated with the noise (e.g., associated with at least one of the target speech, the distractor speech, or the music).

As illustrated in FIG. 1, the device 110 may capture (130) microphone audio data using the microphone array 112. The microphone audio data may include a plurality of signals from individual microphones in the microphone array 112, such that the device 110 may perform beamforming to separate the microphone audio data into beamformed audio data associated with unique directions.

The device 110 may determine (132) first mask data corresponding to the first user 5 based on the microphone audio data and may generate (134) first beamformed audio data based on the first mask data. For example, a first DNN may analyze the microphone audio data and determine frequency bands that correspond to the first speech $s_1(t)$ associated with the first user 5. The first mask data corresponds to a time-frequency map that indicates the frequency bands that are associated with the first speech $s_1(t)$ over time. Based on the first mask data, the device 110 may determine first beamformer parameters (e.g., beamformer coefficients) that are associated with the first speech $s_1(t)$. In some examples, the device 110 may determine a first vector representing one or more look-directions associated with the first speech $s_1(t)$. Based on the first mask data, the first beamformer parameters, and/or the first vector, a first beamformer may generate the first beamformed audio data corresponding to direction(s) associated with the first user 5.

The device 110 may determine (136) second mask data corresponding to the second user 7 based on the microphone audio data and may generate (138) second beamformed audio data based on the second mask data. For example, a second DNN may analyze the microphone audio data and determine frequency bands that correspond to the second speech $s_2(t)$ associated with the second user 7. The second mask data corresponds to a time-frequency map that indicates the frequency bands that are associated with the second speech $s_2(t)$ over time. Based on the second mask data, the device 110 may determine second beamformer parameters (e.g., beamformer coefficients) that are associated with the second speech $s_2(t)$. In some examples, the device 110 may determine a second vector representing one or more look-directions associated with the second speech $s_2(t)$. Based on the second mask data, the second beamformer parameters, and/or the second vector, a second beamformer may generate the second beamformed audio data corresponding to direction(s) associated with the second user 7.

The device 110 may determine (140) third mask data corresponding to the loudspeaker 14 based on the microphone audio data and may generate (142) third beamformed audio data based on the third mask data. For example, a third DNN may analyze the microphone audio data and determine frequency bands that correspond to the playback audio generated by the loudspeaker 14. The third mask data corresponds to a time-frequency map that indicates the frequency bands that are associated with the playback audio over time. Based on the third mask data, the device 110 may determine third beamformer parameters (e.g., beamformer coefficients) that are associated with the playback audio. In some examples, the device 110 may determine a third vector representing one or more look-directions associated with the playback audio. Based on the third mask data, the third beamformer parameters, and/or the third vector, a third beamformer may generate the third beamformed audio data corresponding to direction(s) associated with the loudspeaker 14.

The device 110 may perform (144) noise cancellation to generate output audio data using the first beamformed audio data as a target signal and both the second beamformed audio data and the third beamformed audio data as reference signals. For example, the device 110 may estimate an echo signal based on the second beamformed audio data and the third beamformed audio data and remove the echo signal from the first beamformed audio data to generate the output audio data, which corresponds to the first speech $s_1(t)$.

Figure 2:
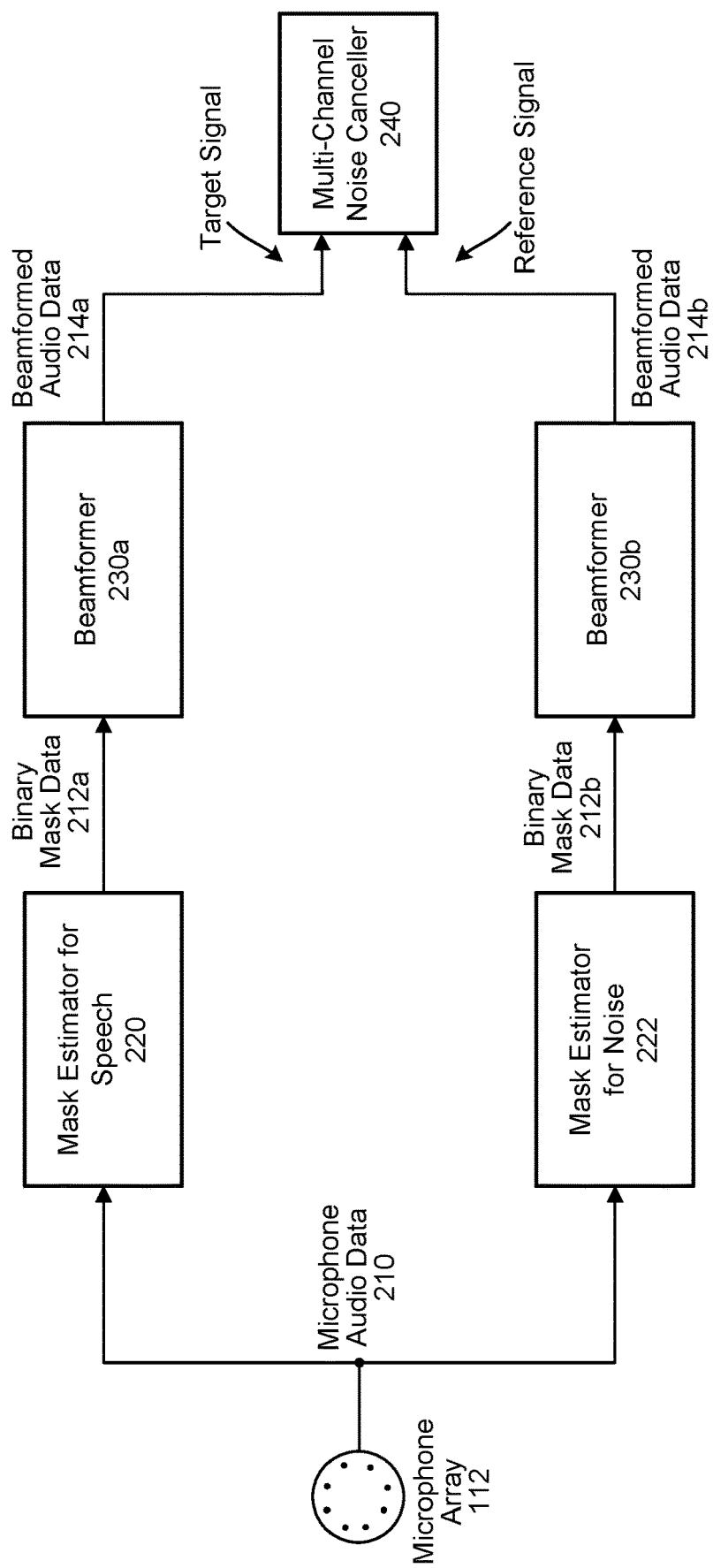
FIG. 2 illustrates an example of performing beamforming using two deep neural networks (DNNs) according to examples of the present disclosure.

FIG. 2 illustrates an example of performing beamforming using two deep neural networks (DNNs) according to examples of the present disclosure. For example, the device 110 may include a first DNN (e.g., mask estimator for speech 220) configured to detect desired (target) speech associated with the first user 5 (e.g., first speech $s_1(t)$) and a second DNN (e.g., mask estimator for noise 222) configured to detect noise (e.g., second speech $s_2(t)$, playback audio generated by the loudspeaker 14, ambient noise in an environment around the device 110, other localized sources, etc.).

The mask estimator for speech 220 may receive the microphone audio data 210, determine that individual frequency bands correspond to the desired speech, and generate first binary mask data 212a indicating the frequency bands that are associated with the desired speech. The device 110 may use the first binary mask data 212a to determine first beamformer parameters (e.g., beamformer coefficients) that are associated with the desired speech. In some examples, the device 110 may determine a first vector corresponding to first direction(s) associated with the first user 5. The first binary mask data 212a, the first beamformer parameters, and/or the first vector may be used by a first beamformer 230a to generate first beamformed audio data 214a corresponding to the first direction.

To illustrate an example of determining the first beamformer parameters, the device 110 may receive the first binary mask data 212a that indicates time-frequency units that correspond to the desired speech. The time-frequency units that correspond to the desired speech (e.g., first speech $s_1(t)$) may be referred to as first target mask data and the other time-frequency units that do not correspond to the desired speech (e.g., second speech $s_2(t)$, playback audio generated by the loudspeaker 14, ambient noise in the environment, etc.) may be referred to as first non-target mask data or noise mask data. To avoid confusion with the second binary mask data 212b that is specifically directed to tracking the noise, the following examples will refer to this mask as the first non-target mask data.

The device 110 may use the first target mask data to calculate a first target cross-power spectral density (CPSD) matrix, and a first steering vector associated with the first target (e.g., desired speech) may be estimated using the principal component of the first target CPSD matrix. The device 110 may use the first non-target mask data to calculate a first non-target CPSD matrix, which corresponds to a "noise CPSD matrix" used to determine the first beamformer coefficients. The device 110 may then calculate the first beamformer coefficients using the first steering vector and the first non-target CPSD matrix, such that the energy of the beamformed speech is minimized and unity gain is maintained at the look direction (e.g., first direction corresponding to the first steering vector).

Similarly, the mask estimator for noise 222 may receive the microphone audio data 210, determine that individual frequency bands correspond to the noise, and generate second binary mask data 212b corresponding to the frequency bands associated with the noise. The device 110 may use the second binary mask data 212b to determine second beamformer parameters (e.g., beamformer coefficients) that are associated with the noise. In some examples, the device 110 may determine a second vector corresponding to second direction(s) associated with the noise source. The second binary mask data 212b, the second beamformer parameters, and/or the second vector may be used by a second beamformer 230b to generate second beamformed audio data 214b corresponding to the second direction.

To illustrate an example of determining the second beamformer parameters, the device 110 may receive the second binary mask data 212b that indicates time-frequency units that correspond to the noise. The time-frequency units that correspond to the noise (e.g., second speech $s_2(t)$, playback audio generated by the loudspeaker 14, ambient noise in the environment, etc.) may be referred to as second target mask data and the other time-frequency units that do not correspond to the noise (e.g., first speech $s_1(t)$) may be referred to as second non-target mask data. The device 110 may use the second target mask data to calculate a second target cross-power spectral density (CPSD) matrix, and a second steering vector associated with the second target (e.g., noise) may be estimated using the principal component of the second target CPSD matrix. As the noise corresponds to all acoustic noises not associated with the desired speech, the second steering vector may correspond to multiple look directions. The device 110 may use the second non-target mask data to calculate a second non-target CPSD matrix, which corresponds to a "noise CPSD matrix" used to determine the second beamformer coefficients. The device 110 may then calculate the second beamformer coefficients using the second steering vector and the second non-target CPSD matrix, such that the energy of the beamformed audio is minimized and unity gain is maintained at the look direction (e.g., one or more second direction(s) corresponding to the second steering vector).

The beamformers 230 may be Minimum Variance Distortionless Response (MVDR) beamformers or Generalized Eigenvalue (GEV) beamformers, although the disclosure is not limited thereto and other beamformers may be used without departing from the disclosure. Thus, the beamformer parameters (e.g., beamformer coefficients) depend on the type of beamformer, with MVDR beamformers having different parameters than GEV beamformers.

As used herein, "noise" may refer to any undesired audio data separate from the desired speech (e.g., first speech $s_1(t)$). Thus, noise may refer to the second speech $s_2(t)$, the playback audio generated by the loudspeaker 14, ambient noise in the environment around the device 110, and/or other sources of audible sounds that may distract from the desired speech. Therefore, "noise cancellation" refers to a process of removing the undesired audio data to isolate the desired speech. This process is similar to acoustic echo cancellation and/or acoustic interference cancellation, and noise is intended to be broad enough to include echoes and interference.

As illustrated in FIG. 2, a multi-channel noise canceller 240 may perform noise cancellation using the first beamformed audio data 214a as a target signal and the second beamformed audio data 214b as a reference signal. For example, the multi-channel noise canceller 240 may remove the second beamformed audio data 214b from the first beamformed audio data 214a to generate output audio data corresponding to the first speech $s_1(t)$.

Figure 3:
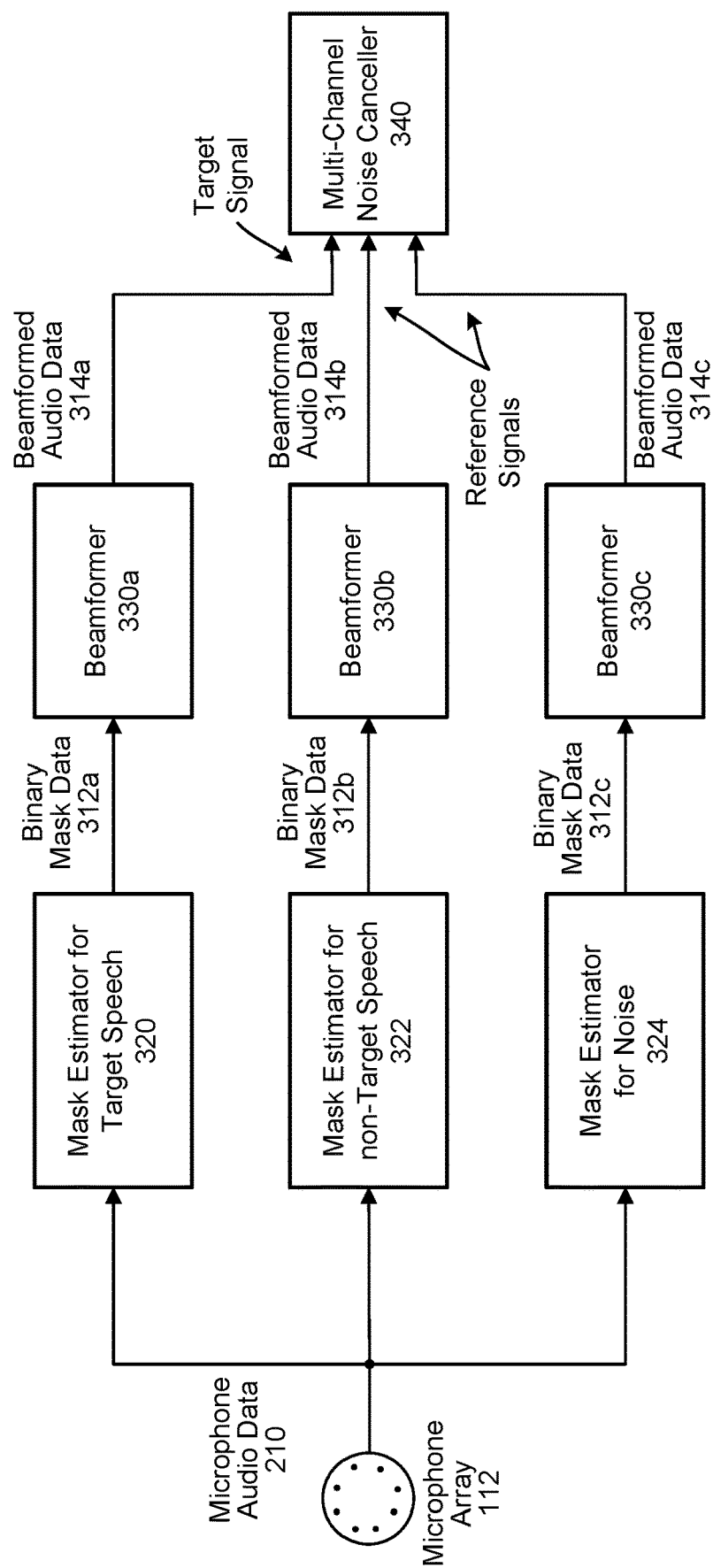
FIG. 3 illustrates an example of performing beamforming using three DNNs according to examples of the present disclosure.

FIG. 3 illustrates an example of performing beamforming using three DNNs according to examples of the present disclosure. For example, a first DNN (e.g., mask estimator for target speech 320) may be configured to detect desired (target) speech associated with the first user 5 (e.g., first speech $s_1(t)$), a second DNN (e.g., mask estimator for non-target speech 322) may be configured to detect undesired (non-target) speech associated with the second user 7 (e.g., second speech $s_2(t)$), and a third DNN (e.g., mask estimator for noise 324) may be configured to detect noise (e.g., playback audio generated by the loudspeaker 14, ambient noise in an environment around the device 110, other localized sources, etc.). While FIG. 3 illustrates three DNNs, the disclosure is not limited thereto and additional DNNs that are configured to detect specific sources of noise may be included without departing from the disclosure.

As discussed above, the mask estimator for target speech 320 may receive the microphone audio data 210, detect individual frequency bands corresponding to the desired speech (e.g., first speech $s_1(t)$), and generate first binary mask data 312a indicating the frequency bands that are associated with the desired speech. The device 110 may use the first binary mask data 312a to determine first beamformer parameters (e.g., beamformer coefficients) that are associated with the desired speech. In some examples, the device 110 may determine a first vector corresponding to first direction(s) associated with the first user 5. The first binary mask data 312a, the first beamformer parameters, and/or the first vector may be used by a first beamformer 330a to generate first beamformed audio data 314a corresponding to the first direction.

To illustrate an example of determining the first beamformer parameters, the device 110 may receive the first binary mask data 312a that indicates time-frequency units that correspond to the desired speech. The time-frequency units that correspond to the desired speech (e.g., first speech $s_1(t)$) may be referred to as first target mask data and the other time-frequency units that do not correspond to the desired speech (e.g., second speech $s_2(t)$, playback audio generated by the loudspeaker 14, ambient noise in the environment, etc.) may be referred to as first non-target mask data. The device 110 may use the first target mask data to calculate a first target cross-power spectral density (CPSD) matrix, and a first steering vector associated with the first target (e.g., desired speech) may be estimated using the principal component of the first target CPSD matrix. The device 110 may use the first non-target mask data to calculate a first non-target CPSD matrix, which corresponds to a "noise CPSD matrix" used to determine the first beamformer coefficients. The device 110 may then calculate the first beamformer coefficients using the first steering vector and the first non-target CPSD matrix, such that the energy of the beamformed speech is minimized and unity gain is maintained at the look direction (e.g., first direction corresponding to the first steering vector).

Similarly, the mask estimator for non-target speech 322 may receive the microphone audio data 210, detect individual frequency bands corresponding to the undesired speech (e.g., second speech $s_2(t)$), and generate second binary mask data 312b indicating the frequency bands that are associated with the undesired speech. The device 110 may use the second binary mask data 312b to determine second beamformer parameters (e.g., beamformer coefficients) that are associated with the undesired speech. In some examples, the device 110 may determine a second vector corresponding to second direction(s) associated with the second user 7. The second binary mask data 312b, the second beamformer parameters, and/or the second vector may be used by a second beamformer 330b to generate second beamformed audio data 314b corresponding to the second direction.

To illustrate an example of determining the second beamformer parameters, the device 110 may receive the second binary mask data 312b that indicates time-frequency units that correspond to the non-target speech. The time-frequency units that correspond to the non-target speech (e.g., second speech $s_2(t)$) may be referred to as second target mask data and the other time-frequency units that do not correspond to the non-target speech (e.g., first speech $s_1(t)$, playback audio generated by the loudspeaker 14, ambient noise in the environment, etc.) may be referred to as second non-target mask data. The device 110 may use the second target mask data to calculate a second target cross-power spectral density (CPSD) matrix, and a second steering vector associated with the second target (e.g., non-target speech) may be estimated using the principal component of the second target CPSD matrix. As the non-target speech corresponds to the second user 7, the second steering vector may correspond to a second look direction corresponding to the second user 7. The device 110 may use the second non-target mask data to calculate a second non-target CPSD matrix, which corresponds to the "noise CPSD matrix" used to determine the second beamformer coefficients. The device 110 may then calculate the second beamformer coefficients using the second steering vector and the second non-target CPSD matrix, such that the energy of the beamformed audio is minimized and unity gain is maintained at the look direction (e.g., second direction corresponding to the second steering vector).

In addition, the mask estimator for noise 324 may receive the microphone audio data 210, detect individual frequency bands corresponding to the noise (e.g., playback audio generated by the loudspeaker 14, ambient noise in an environment around the device 110, other localized sources, etc.), and generate third binary mask data 312c indicating the frequency bands that are associated with the noise. The device 110 may use the third binary mask data 312c to determine third beamformer parameters (e.g., beamformer coefficients) that are associated with the noise. In some examples, the device 110 may determine a third vector corresponding to third direction(s) associated with the loudspeaker 14 and/or other directions of noise sources. The third binary mask data 312c, the third beamformer parameters, and/or the third vector may be used by a third beamformer 330c to generate third beamformed audio data 314c corresponding to the third direction.

To illustrate an example of determining the third beamformer parameters, the device 110 may receive the third binary mask data 312c that indicates time-frequency units that correspond to the noise. The time-frequency units that correspond to the noise (e.g., playback audio generated by the loudspeaker 14, ambient noise in the environment, etc.) may be referred to as third target mask data and the other time-frequency units that do not correspond to the noise (e.g., first speech $s_1(t)$ and second speech $s_2(t)$) may be referred to as third non-target mask data. The device 110 may use the third target mask data to calculate a third target cross-power spectral density (CPSD) matrix, and a third steering vector associated with the third target (e.g., noise) may be estimated using the principal component of the third target CPSD matrix. As the noise corresponds to all acoustic noises not associated with the target speech or the non-target speech, the third steering vector may correspond to multiple look directions. The device 110 may use the third non-target mask data to calculate a third non-target CPSD matrix, which corresponds to the "noise CPSD matrix" used to determine the third beamformer coefficients. The device 110 may then calculate the third beamformer coefficients using the third steering vector and the third non-target CPSD matrix, such that the energy of the beamformed audio is minimized and unity gain is maintained at the look direction(s) (e.g., one or more third direction(s) corresponding to the third steering vector).

As illustrated in FIG. 3, a multi-channel noise canceller 340 may perform noise cancellation using the first beamformed audio data 314a as a target signal and both the second beamformed audio data 314b and the third beamformed audio data 314c as reference signals. For example, the multi-channel noise canceller 340 may remove the second beamformed audio data 314b and the third beamformed audio data 314c from the first beamformed audio data 314a to generate output audio data corresponding to the first speech $s_1(t)$.

Figure 4A:
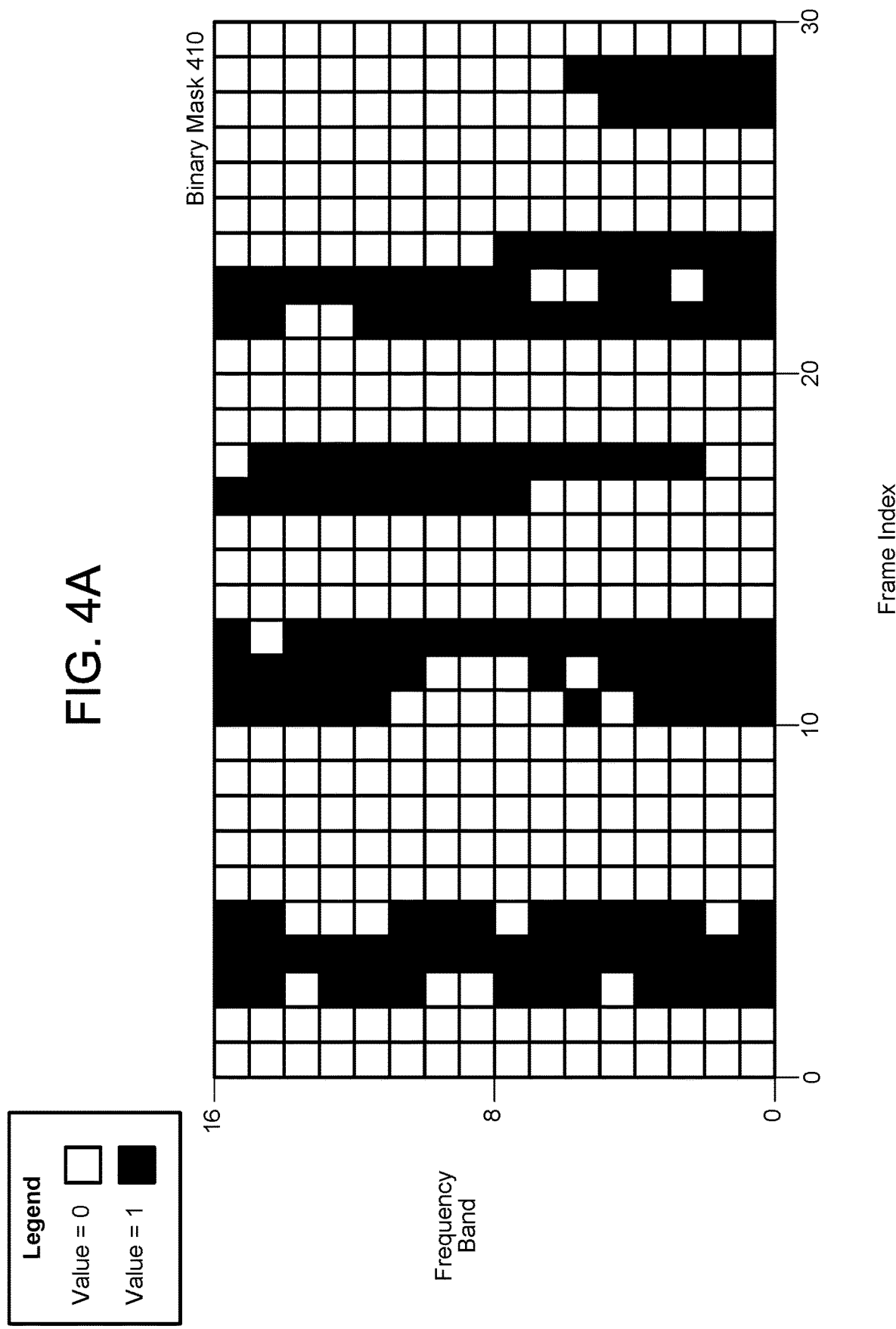
FIGS. 4A-4B illustrate examples of binary masks generated by a single DNN according to examples of the present disclosure.
Figure 4B:
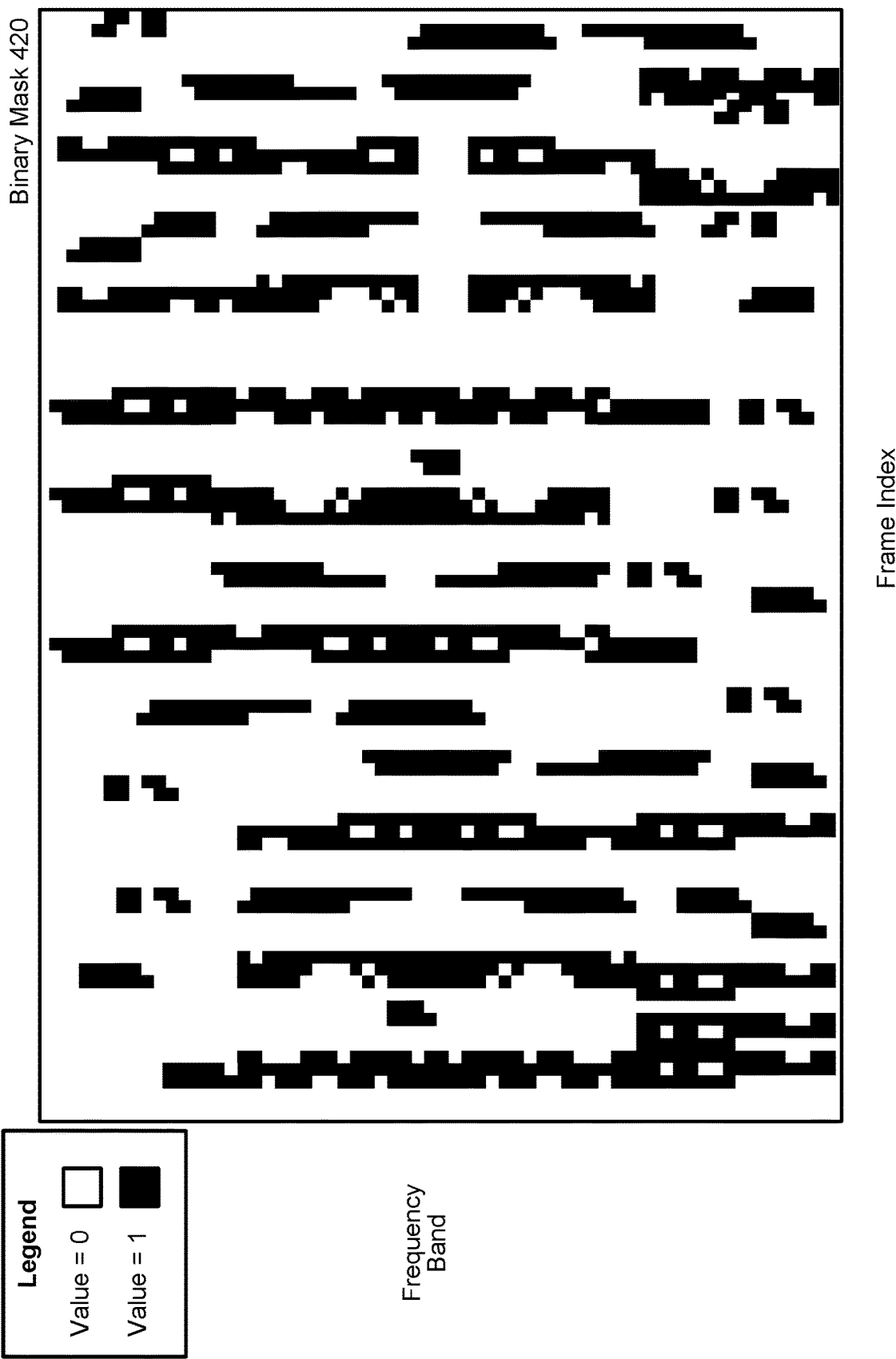

FIGS. 4A-4B illustrate examples of binary masks generated by a single DNN according to examples of the present disclosure. As illustrated in FIG. 4A, a DNN may analyze the microphone audio data z(t) over time to determine which frequency bands and frame indexes correspond to a desired classification. For example, if the DNN is configured to detect speech, the DNN may generate a binary mask 410 indicating frequency bands that correspond to speech, with a value of 0 (e.g., white) indicating that the frequency band does not correspond to speech and a value of 1 (e.g., black) indicating that the frequency band does correspond to speech.

The binary mask 410 indicates frequency bands along the vertical axis and frame indexes along the horizontal axis. For ease of illustration, the binary mask 410 includes only a few frequency bands (e.g., 16). However, the device 110 may determine gain values for any number of frequency bands without departing from the disclosure. For example, FIG. 4B illustrates a binary mask 420 corresponding to 64 frequency bands, although the device 110 may generate a binary mask for 128 frequency bands or more without departing from the disclosure.

While FIGS. 4A-4B illustrate binary masks, the disclosure is not limited thereto and the mask data generated by the DNNs may correspond to continuous values, with black representing a mask value of one (e.g., high likelihood that speech is detected), white representing a mask value of zero (e.g., low likelihood that speech is detected), and varying shades of gray representing intermediate mask values between zero and one (e.g., specific confidence level corresponding to a likelihood that speech is detected).

Figure 5A:
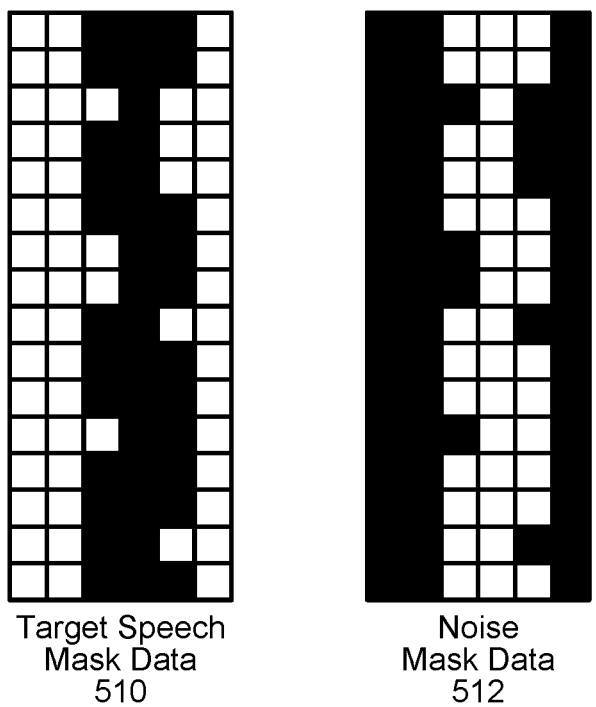
FIGS. 5A-5D illustrate examples of binary masks generated by multiple DNNs according to examples of the present disclosure.
Figure 5B:
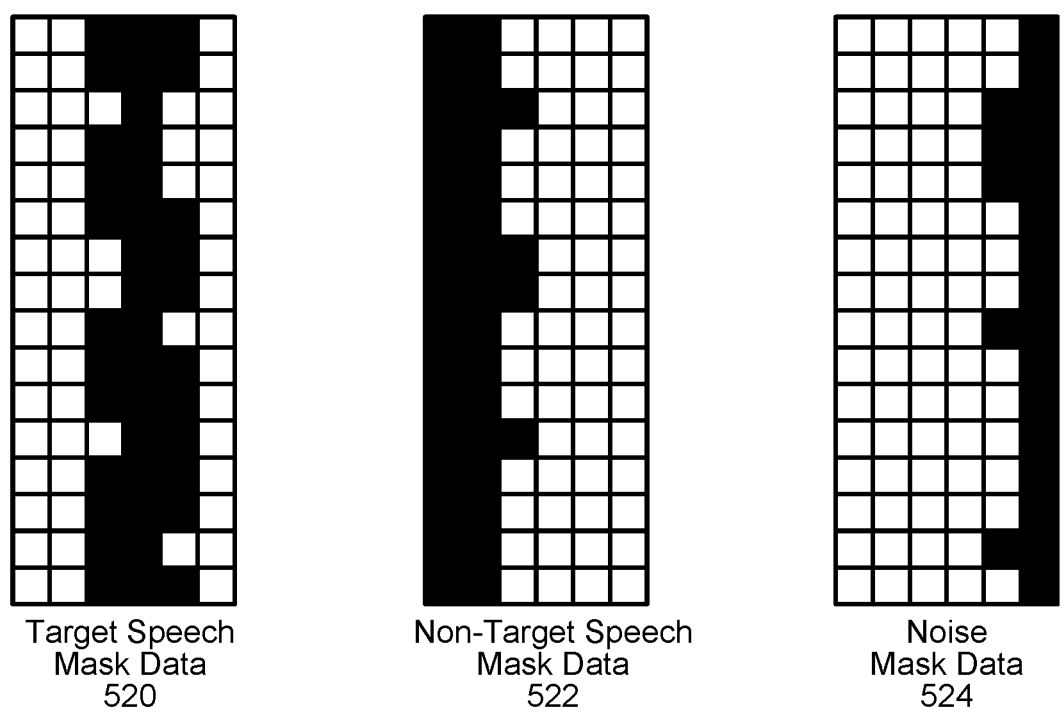

FIGS. 5A-5D illustrate examples of binary masks generated by multiple DNNs according to examples of the present disclosure, with a value of zero represented as white and a value of one represented as black. As illustrated in FIGS. 5A-5B, the device 110 may associate each frequency band with a DNN. For example, a first DNN may be configured to generate target speech mask data 510 associated with a user and a second DNN may be configured to generate noise mask data 512 associated with ambient noise in an environment around the device 110 (which may include playback audio generated by the loudspeaker 14). As every frequency band is associated with a DNN, FIG. 5A illustrates that each frequency band is associated with either the target speech mask data 510 or the noise mask data 512.

Similarly, FIG. 5B illustrates an example using three DNNs; a first DNN configured to generate target speech mask data 520 associated with the first user 5, a second DNN configured to generate non-target speech mask data 522 associated with the second user 7, and a third DNN configured to generate noise mask data 524 associated with ambient noise in an environment around the device 110 (which may include playback audio generated by the loudspeaker 14). As illustrated in FIG. 5B, every frequency band is associated with one of the target speech mask data 520, the non-target speech mask data 522, or the noise mask data 524.

Figure 5C:
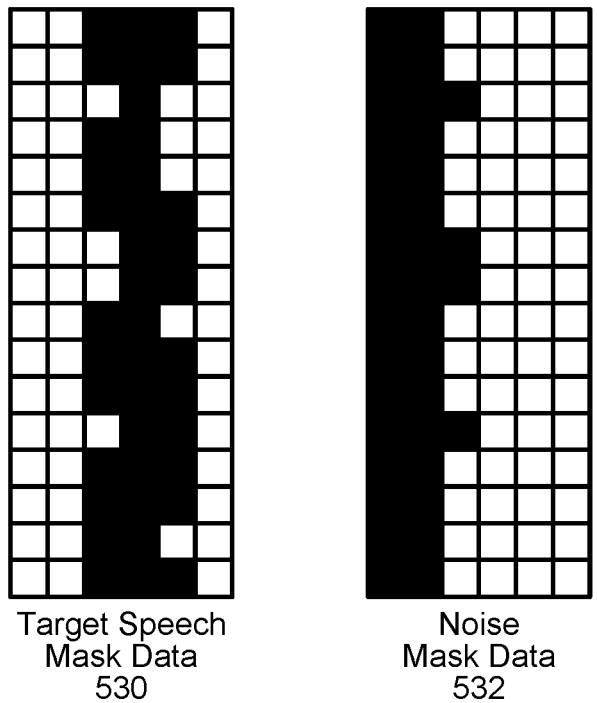

However, the disclosure is not limited thereto and in some examples, frequency bands do not need to be associated with any DNN (e.g., a frequency band may have a value of zero for all mask data). For example, a first DNN may be configured to generate target speech mask data 530 associated with a user and a second DNN may be configured to generate noise mask data 532 associated with ambient noise in an environment around the device 110 (which may include playback audio generated by the loudspeaker 14). However, as illustrated in FIG. 5C, some frequency bands (e.g., entire right-most column) are not associated with either the target speech mask data 530 or the noise mask data 532 without departing from the disclosure.

Figure 5D:
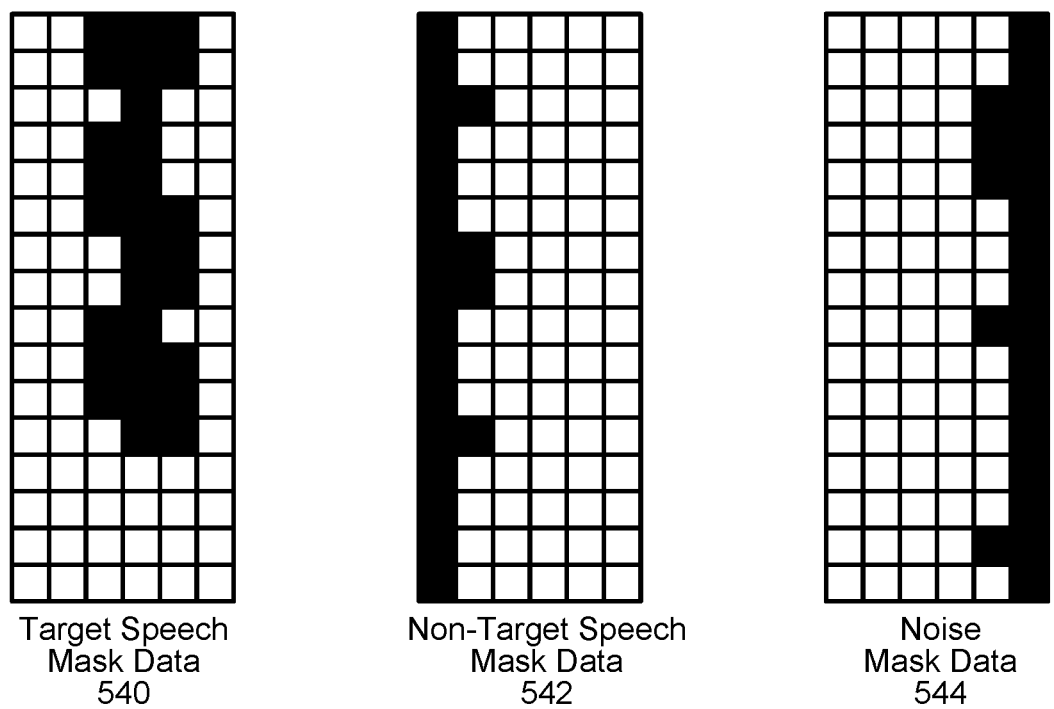

Similarly, FIG. 5D illustrates an example using three DNNs; a first DNN configured to generate target speech mask data 540 associated with the first user 5, a second DNN configured to generate non-target speech mask data 542 associated with the second user 7, and a third DNN configured to generate noise mask data 544 associated with ambient noise in an environment around the device 110 (which may include playback audio generated by the loudspeaker 14). However, as illustrated in FIG. 5D, some frequency bands (e.g., portions of the second column or bottom middle) are not associated with one of the target speech mask data 540, the non-target speech mask data 542, or the noise mask data 544.

While FIGS. 5A-5D illustrate mask data generated by 2 or 3 DNNs, the disclosure is not limited thereto and the device 110 may include any number of DNNs specifically configured to detect particular sounds. For example, the device 110 may include a first DNN configured to detect desired (target) speech (e.g., first speech $s_1(t)$), a second DNN configured to detect undesired (non-target) speech (e.g., second speech $s_2(t)$), a third DNN configured to detect music, a fourth DNN configured to detect noises associated with a microwave, a fifth DNN configured to detect noises associated with power tools, etc. Thus, a DNN can be configured to detect a specific noise (e.g., specifically configured to detect noises associated with one of appliances, power tools, mechanical vibrations, traffic noises, animal noises, etc.) or may be configured to detect a range of noises (e.g., configured to detect noises associated with two or more sources of noise) without departing from the disclosure.

FIG. 6 illustrates an example of audio data input to a DNN and audio data output from a beamformer according to examples of the present disclosure. As illustrated in FIG. 6, microphone audio data 610 may be represented as a first audio waveform 640 that includes audio data corresponding to a number of sources, such as the first user 5, the second user 7, the loudspeaker 14 and so on. Thus, the first audio waveform 640 includes a lot of activity. The mask estimator for target speech 620 may correspond to a first DNN and may be configured to generate binary mask data 612, which may be represented as a time-frequency map 642 indicating first frequency bands associated with target speech (e.g., first speech $s_1(t)$ associated with the first user 5). Using the binary mask data 612, the device 110 may determine a look-direction associated with the target speech (e.g., first direction associated with the first user 5) and the beamformer 630 may generate beamformed audio data 614 corresponding to the look-direction. As illustrated in FIG. 6, the beamformed audio data 614 may be represented as a second audio waveform 644 that only includes audio data associated with the first user 5, with remaining portions of the microphone audio data 610 represented in the first audio waveform 640 (e.g., audio data associated with the second user 7, the loudspeaker 14, etc.) removed. Thus, the beamformed audio data 614 only corresponds to the first speech $s_1(t)$ associated with the first user 5 and may be used as a target signal for noise cancelling.

For ease of illustration, FIG. 6 illustrates the mask estimator for target speech 620 being used to generate beamformed audio data 614 corresponding to the target speech (e.g., first speech $s_1(t)$). However, the disclosure is not limited thereto and the same steps may be performed by a second DNN to generate beamformed audio data corresponding to the non-target speech (e.g., second speech $s_2(t)$), a third DNN to generate beamformed audio data corresponding to the loudspeaker 14, a fourth DNN to generate beamformed audio data corresponding to a noise source, and/or the like. The beamformed audio data corresponding to noise source(s) may be used as reference signal(s) for noise cancelling.

Figure 7A:
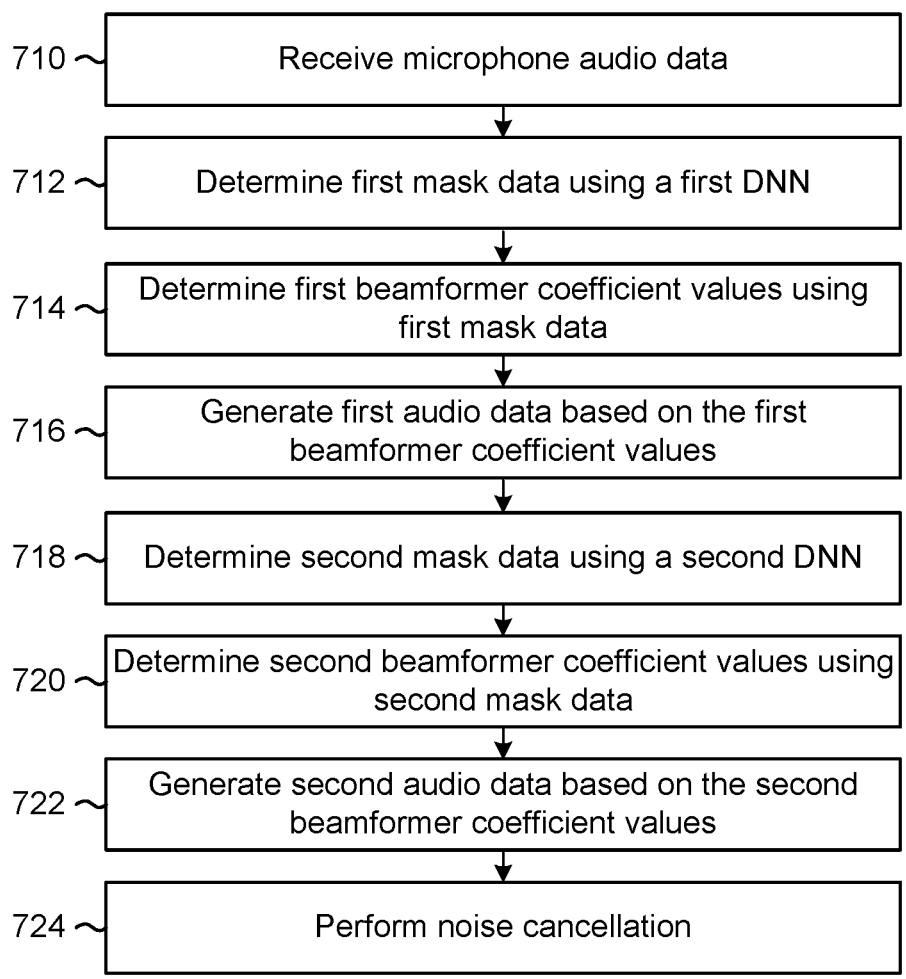

FIGS. 7A-7B are flowcharts conceptually illustrating example methods for performing beamforming using multiple DNNs according to examples of the present disclosure. As illustrated in FIG. 7A, the device 110 may receive (710) microphone audio data and may determine (712) first mask data using a first DNN. For example, the first DNN may be configured to detect desired (target) speech associated with the first user 5 (e.g., first speech $s_1(t)$). Thus, the first DNN may receive the microphone audio data 210, detect individual frequency bands corresponding to the desired speech, and generate the first mask data indicating frequency bands that are associated with the desired speech. The device 110 may determine (714) first beamformer coefficient values using the first mask data and may generate (716) first audio data based on the first beamformer coefficient values. In some examples, the device 110 may determine a first vector corresponding to first direction(s) associated with the first user 5. A first beamformer may use the first mask data, the first beamformer coefficient values, and/or the first vector to generate the first audio data, which corresponds to the first direction(s).

The device 110 may determine (718) second mask data using a second DNN. For example, the second DNN may be configured to detect noise, which corresponds to undesired (non-target) speech associated with the second user 7 (e.g., second speech $s_2(t)$), playback audio generated by the loudspeaker 14, ambient noise in an environment around the device 110, other localized sources, and/or the like. Thus, the second DNN may receive the microphone audio data 210, detect individual frequency bands corresponding to the noise, and generate the second mask data indicating frequency bands that are associated with the noise. The device 110 may determine (720) second beamformer coefficient values using the second mask data and may generate (722) second audio data based on the second beamformer coefficient values. In some examples, the device 110 may determine a second vector corresponding to second direction(s) associated with the noise sources (e.g., second user 7, loudspeaker 14, etc.). A second beamformer may use the second mask data, the second beamformer coefficient values, and/or the second vector to generate the second audio data, which corresponds to the second direction(s).

The first beamformer and the second beamformer may be Minimum Variance Distortionless Response (MVDR) beamformers or Generalized Eigenvalue (GEV) beamformers, although the disclosure is not limited thereto and other beamformers may be used without departing from the disclosure. Thus, the beamformer coefficient values depend on the type of beamformer, with MVDR beamformers having different coefficients than GEV beamformers.

The device 110 may perform (724) noise cancellation to remove the noise (e.g., undesired audio data) in order to isolate the desired speech. For example, a noise canceller may perform noise cancellation using the first audio data as a target signal and the second audio data as a reference signal, removing at least a portion of the second audio data from the first audio data to generate output audio data corresponding to the first speech $s_1(t)$.

As illustrated in FIG. 7B, the device 110 may receive (750) microphone audio data and may determine (752) first mask data using a first DNN. For example, the first DNN may be configured to detect desired (target) speech associated with the first user 5 (e.g., first speech $s_1(t)$). Thus, the first DNN may receive the microphone audio data 210, detect individual frequency bands corresponding to the desired speech, and generate the first mask data indicating frequency bands that are associated with the desired speech. The device 110 may determine (754) first beamformer coefficient values using the first mask data and may generate (756) first audio data based on the first beamformer coefficient values. In some examples, the device 110 may determine a first vector corresponding to first direction(s) associated with the first user 5. A first beamformer may use the first mask data, the first beamformer coefficient values, and/or the first vector to generate the first audio data, which corresponds to the first direction(s).

The device 110 may determine (758) second mask data using a second DNN. For example, the second DNN may be configured to detect undesired (non-target) speech associated with the second user 7 (e.g., second speech $s_2(t)$). Thus, the second DNN may receive the microphone audio data 210, detect individual frequency bands corresponding to the undesired speech, and generate the second mask data indicating frequency bands that are associated with the undesired speech. The device 110 may determine (760) second beamformer coefficient values using the second mask data and may generate (762) second audio data based on the second beamformer coefficient values. In some examples, the device 110 may determine a second vector corresponding to second direction(s) associated with the second user 7. A second beamformer may use the second mask data, the second beamformer coefficient values, and/or the second vector to generate the second audio data, which corresponds to the second direction(s).

The device 110 may determine (764) third mask data using a third DNN. For example, the third DNN may be configured to detect noise, which corresponds to playback audio generated by the loudspeaker 14, ambient noise in an environment around the device 110, other localized sources, and/or the like. For example, the third DNN may receive the microphone audio data 210, detect individual frequency bands corresponding to the noise, and generate the third mask data indicating frequency bands that are associated with the noise. The device 110 may determine (766) third beamformer coefficient values using the third mask data and may generate (768) third audio data based on the third beamformer coefficient values. In some examples, the device 110 may determine a third vector corresponding to third direction(s) associated with the noise sources (e.g., loudspeaker 14, etc.). A third beamformer may use the third mask data, the third beamformer coefficient values, and/or the third vector to generate the third audio data, which corresponds to the third direction(s).

The device 110 may optionally combine (770) the second audio data and the third audio data into a reference signal prior to performing noise cancellation. However, the disclosure is not limited thereto and the device 110 may perform noise cancellation with multiple reference signals without departing from the disclosure. For example, the device 110 may generate first estimated echo data using the second audio data and may generate second estimated echo data using the third audio data. The device 110 may then combine the first estimated echo data and the second estimated echo data as the combined reference signal, or may perform first noise cancellation using the first estimated echo data and then perform second noise cancellation using the second estimated echo data.

The device 110 may perform (772) noise cancellation to remove the undesired speech and the noise (e.g., undesired audio data) in order to isolate the desired speech. For example, a noise canceller may perform noise cancellation using the first audio data as a target signal and either the combined reference signal or the second audio data and the third audio data as separate reference signals. As part of noise cancellation, the device 110 may estimate echo audio data based on the reference signal. Thus, the noise canceller may remove at least a portion of the second audio data and the third audio data (e.g., estimated echo audio data generated based on the second audio data and the third audio data) from the first audio data to generate output audio data corresponding to the first speech $s_1(t)$.

For ease of illustration, FIGS. 7A-7B illustrate a separate DNN tracking each type of audio category. For example, the first DNN is configured to locate and track desired speech (e.g., first audio category), the second DNN is configured to locate and track undesired speech (e.g., second audio category), a third DNN may be configured to locate and track a noise source (e.g., third audio category), etc. Each DNN may be trained individually, although the disclosure is not limited thereto. However, the disclosure is not limited to multiple DNNs and the multiple DNNs may correspond to a single DNN that is configured to track multiple audio categories without departing from the disclosure. For example, a single DNN may be configured to locate and track the desired speech (e.g., generate a first binary mask corresponding to the first audio category) while also locating and tracking the noise source (e.g., generate a second binary mask corresponding to the second audio category). In some examples, a single DNN may be configured to generate three or more binary masks corresponding to three or more audio categories without departing from the disclosure. Additionally or alternatively, a single DNN may be configured to group audio data into different categories and tag or label the audio data accordingly. For example, the DNN may classify the audio data as first speech, second speech, music, noise, etc.

Figure 8:
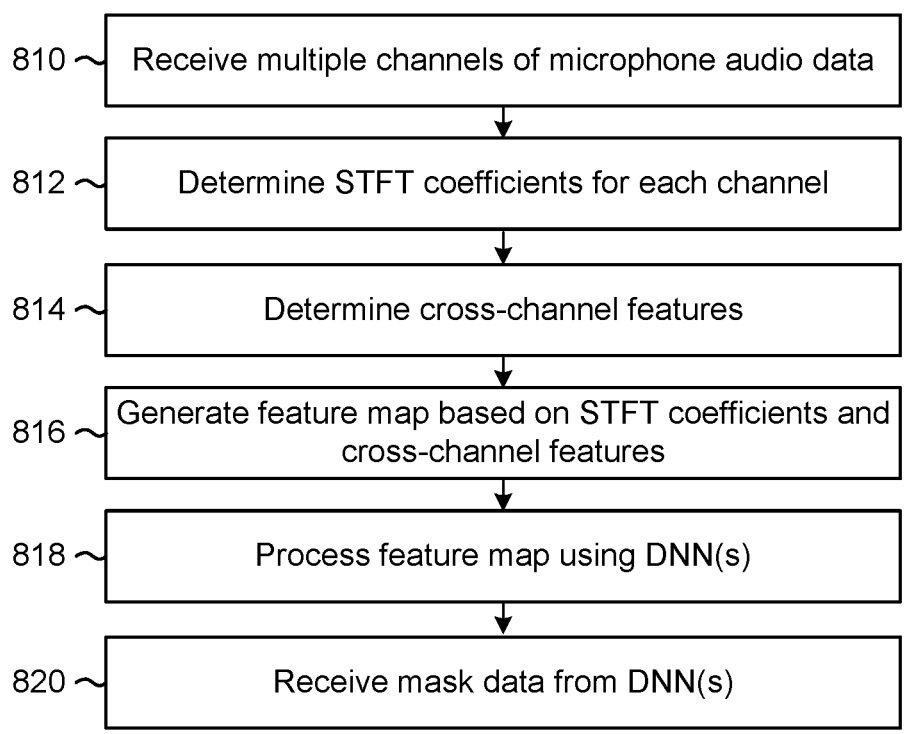
FIG. 8 is a flowchart conceptually illustrating a method for generating mask data according to examples of the present disclosure.

FIG. 8 is a flowchart conceptually illustrating a method for generating mask data according to examples of the present disclosure. In order to generate the mask data, the device 110 may divide the digitized audio data into frames representing time intervals and may separate the frames into separate frequency bands. The device 110 may determine a number of values, called features, representing the qualities of the audio data, along with a set of those values, called a feature vector or audio feature vector, representing the features/qualities of the audio data within the frame for a particular frequency band. In some examples, the DNNs may generate the mask data based on the features vectors. Many different features may be determined, as known in the art, and each feature represents some quality of the audio that may be useful for the DNN to generate the mask data. A number of approaches may be used by the device 110 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

In some examples, the device 110 may process the audio data using one or more DNNs and receive one or more binary masks as output from the one or more DNNs. Thus, the DNNs may process the audio data and determine the feature vectors used to generate the one or more binary masks. However, the disclosure is not limited thereto and in other examples the device 110 may determine the feature vectors from the audio data, process the feature vectors using the one or more DNNs, and receive the one or more binary masks as output from the one or more DNNs.

As illustrated in FIG. 8, the device 110 may receive multiple channels of microphone audio data (e.g., two or more channels corresponding to two or more microphones of the microphone array 112) and may determine (812) short-time Fourier transform (STFT) coefficients for each channel. For example, the device 110 may perform STFT to the audio data to generate STFT coefficients and may input the STFT coefficients to the one or more DNNs as a time-frequency feature map. In some examples, the device 110 may stack STFT coefficients corresponding to two or more audio channels as the feature map (e.g., stack two-channel STFT coefficients).

In addition to the STFT coefficients, the device 110 may determine (814) cross-channel features to improve the feature map. For example, the device 110 may determine cross-channel features such as phase differences (e.g., phase differences between two channels in the example using two-channel STFT coefficients) and cross-power spectral density (CPSD) matrices (e.g., real and imaginary components of a CPSD between the two channels). As phase differences between microphones encode directionality of a source, the phase differences are useful for separating sources from different directions. In addition, since the imaginary component of the ideal diffuse noise CPSD is always close to zero, the imaginary component of the CPSD matrices tends to have larger values at speech-dominant time-frequency units (e.g., a first time-frequency unit corresponds to a first time interval and a first frequency band). Therefore, the CPSD based cross-channel features are useful for separating speech from diffuse noise.

The device 110 may generate (816) the feature map based on the STFT coefficients and the cross-channel features, may process (818) the feature map using one or more DNN(s), and may receive (820) mask data from the DNN(s). In the example illustrated in FIG. 8, each of the mask estimators would perform steps 810-820 for a particular audio category and generate binary mask data specific to the audio category. The binary masks may correspond to binary flags for each of the time-frequency units, with a first binary value indicating that the time-frequency unit corresponds to the detected audio category (e.g., speech, music, noise, etc.) and a second binary value indicating that the time-frequency unit does not correspond to the detected audio category. For example, a first DNN may be associated with a first audio category (e.g., target speech), a second DNN may be associated with a second audio category (e.g., non-target or distractor speech), a third DNN may be associated with a third audio category (e.g., music), and a fourth DNN may be associated with a fourth audio category (e.g., noise).

Each of the DNNs may generate a binary mask based on the corresponding audio category. Thus, the first DNN may generate a first binary mask that classifies each time-frequency unit as either being associated with the target speech or not associated with the target speech (e.g., associated with at least one of the distractor speech, music, or noise). Similarly, the second DNN may generate a second binary mask that classifies each time-frequency unit as either being associated with the distractor speech or not associated with the distractor speech (e.g., associated with at least one of the target speech, music, or noise). The third DNN may generate a third binary mask that classifies each time-frequency unit as either being associated with the music or not associated with the music (e.g., associated with at least one of the target speech, distractor speech, or noise). Finally, the fourth DNN may generate a fourth binary mask that classifies each time-frequency unit as either being associated with the noise or not associated with the noise (e.g., associated with at least one of the target speech, the distractor speech, or the music).

Figure 9:
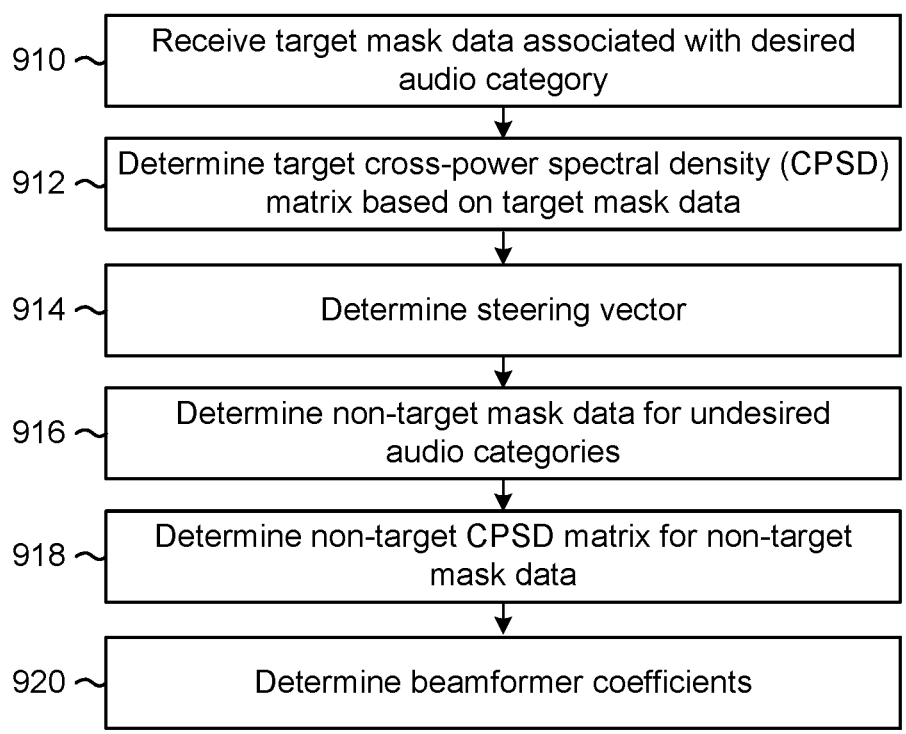
FIG. 9 is a flowchart conceptually illustrating a method for determining beamformer coefficient values according to examples of the present disclosure.

FIG. 9 is a flowchart conceptually illustrating a method for determining beamformer coefficient values according to examples of the present disclosure. As illustrated in FIG. 9, the device 110 may receive (910) target mask data that indicates time-frequency units that correspond to a desired audio category (e.g., desired speech, non-target speech, playback audio generated by the loudspeaker 14, etc.). The time-frequency units that correspond to the desired audio category (e.g., first speech $s_1(t)$ for the desired speech) may be referred to as target mask data and the other time-frequency units that do not correspond to the desired speech (e.g., second speech $s_2(t)$, playback audio generated by the loudspeaker 14, ambient noise in the environment, etc.) may be referred to as non-target mask data. The device 110 may use the target mask data to determine (912) a target cross-power spectral density (CPSD) matrix, and may determine (914) a steering vector associated with the desired audio category (e.g., desired speech) using the principal component of the target CPSD matrix.

The device 110 may determine (916) non-target mask data for the undesired audio categories (e.g., second speech $s_2(t)$, playback audio generated by the loudspeaker 14, ambient noise in the environment, etc.) based on the target mask data. The device 110 may use the non-target mask data to determine (918) a non-target CPSD matrix, which corresponds to a "noise CPSD matrix" used to determine the beamformer coefficients. The device 110 may then determine (920) the beamformer coefficients using the steering vector and the non-target CPSD matrix, such that the energy of the beamformed speech is minimized and unity gain is maintained at the look direction (e.g., first direction corresponding to the first steering vector).

In the example illustrated in FIG. 9, each of the beamformers would perform steps 910-920 for a particular audio category and generate beamformer coefficients specific to the audio category. For example, a first beamformer may be associated with a first audio category (e.g., target speech), a second beamformer may be associated with a second audio category (e.g., non-target or distractor speech), a third beamformer may be associated with a third audio category (e.g., music), and a fourth beamformer may be associated with a fourth audio category (e.g., noise). Each of the beamformers may generate a beamformer coefficients based on the corresponding audio category. Thus, the first beamformer may generate first beamformer coefficients associated with the target speech (e.g., such that the non-target mask data is associated with at least one of the distractor speech, music, or noise). Similarly, the second beamformer may generate second beamformer coefficients associated with the distractor speech (e.g., such that the non-target mask data is associated with at least one of the target speech, music, or noise). The third beamformer may generate third beamformer coefficients associated with the music (e.g., such that the non-target mask data is associated with at least one of the target speech, distractor speech, or noise). Finally, the fourth beamformer may generate fourth beamformer coefficients associated with the noise (e.g., such that the non-target mask data is associated with at least one of the target speech, the distractor speech, or the music).

Figure 10:
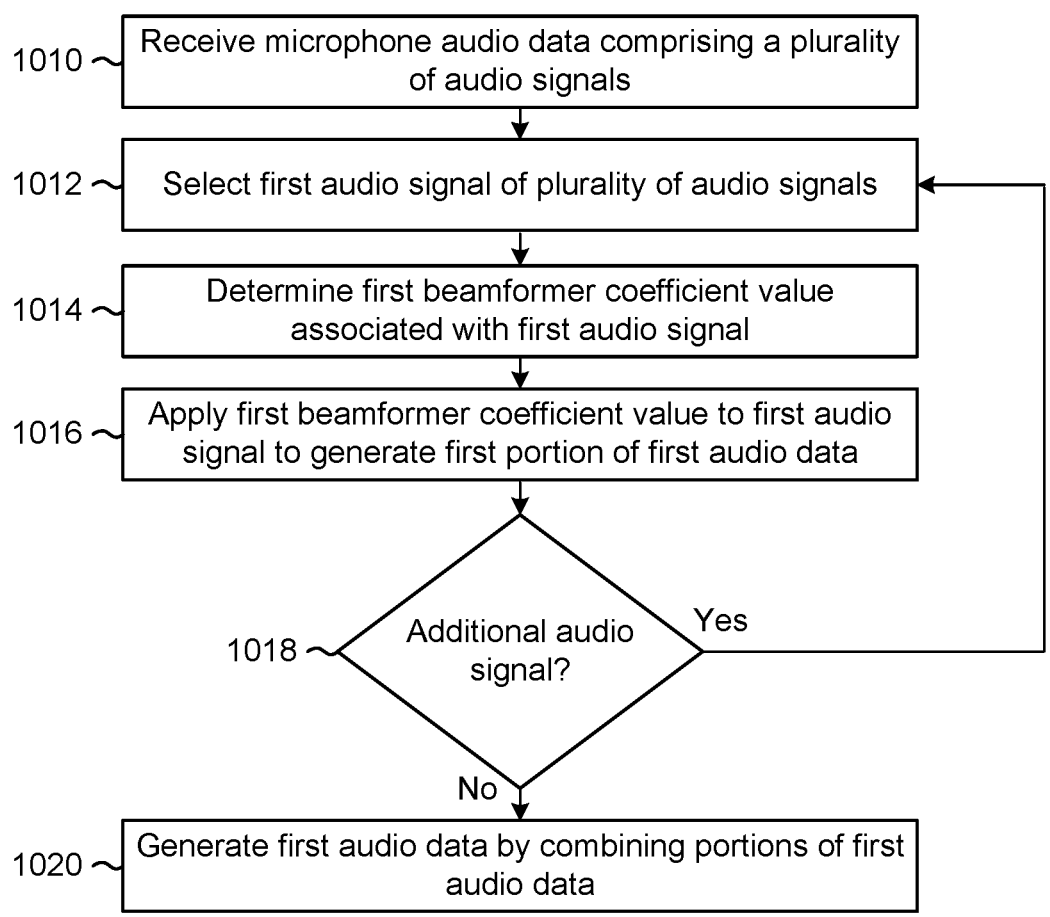
FIG. 10 is a flowchart conceptually illustrating a method for generating beamformed audio data according to examples of the present disclosure.

FIG. 10 is a flowchart conceptually illustrating a method for generating beamformed audio data according to examples of the present disclosure. As illustrated in FIG. 10, the device 110 may receive (1010) microphone audio data comprising a plurality of audio signals. For example, the microphone array may include 8 unique microphones and the microphone audio data may be comprised of 8 unique audio signals.

The device 110 may select (1012) a first audio signal of the plurality of audio signals, determine (1014) a first beamformer coefficient value associated with the first audio signal and apply (1016) the first beamformer coefficient value to the first audio signal to generate a first portion of the first audio data. For example, the device 110 may weight each of the audio signals based on the beamformer coefficient values associated with the direction of interest.

The device 110 may determine (1018) whether there is an additional audio signal, and, if so, may loop to step 1012 and repeat steps 1012-1018. If there are no additional audio signals, the device 110 may generate (1020) the first audio data by combining the portions of the first audio data generated for each of the plurality of audio signals.

Figure 11A:
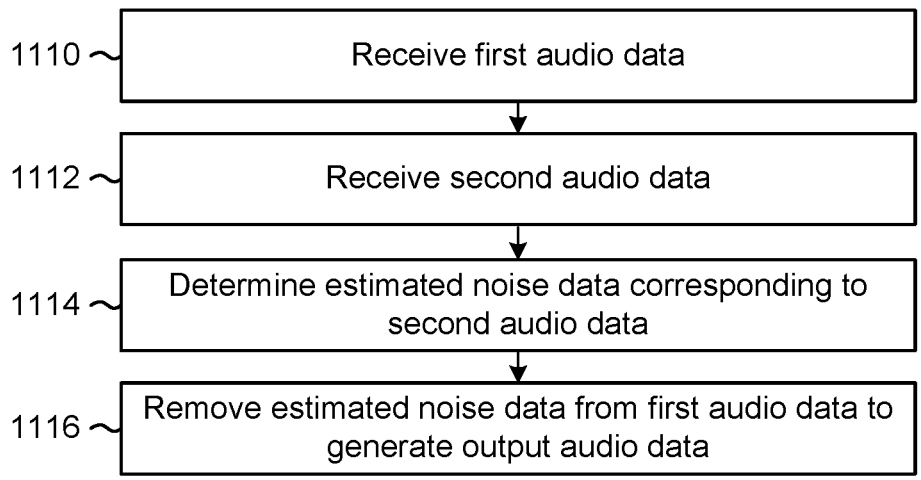
FIGS. 11A-11C are flowcharts conceptually illustrating example methods for performing acoustic echo cancellation according to examples of the present disclosure.
Figure 11B:
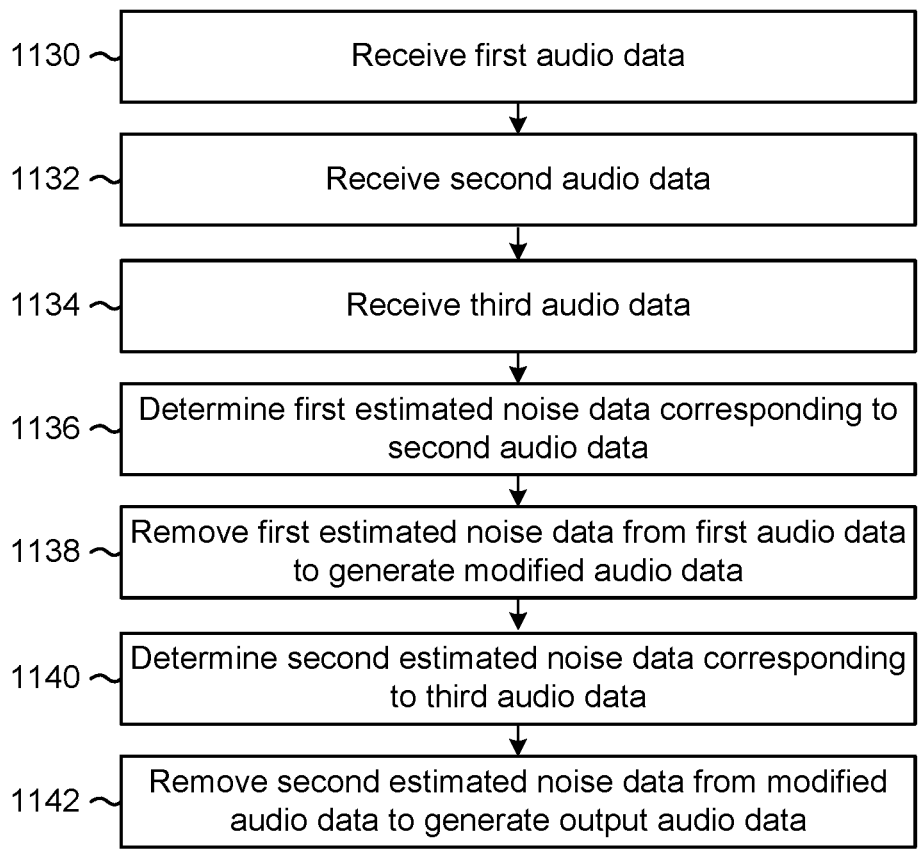

FIGS. 11A-11B are flowcharts conceptually illustrating example methods for performing acoustic echo cancellation according to examples of the present disclosure. As illustrated in FIG. 11A, the device 110 may receive (1110) first audio data corresponding to a target signal (e.g., desired speech) and receive (1112) second audio data corresponding to a reference signal (e.g., noise). The device 110 may determine (1114) estimated noise data corresponding to the second audio data and may remove (1116) the estimated noise data from the first audio data to generate output audio data.

As illustrated in FIG. 11B, the device 110 may receive (1130) first audio data corresponding to a target signal (e.g., desired speech), receive (1132) second audio data corresponding to a non-target signal (e.g., undesired speech), and receive (1134) third audio data corresponding to noise. The device 110 may determine (1136) first estimated noise data corresponding to the second audio data and may remove (1138) the first estimated noise data from the first audio data to generate modified audio data. The device 110 may then determine (1140) second estimated noise data corresponding to the third audio data and may remove (1142) the second estimated noise data from the modified audio data to generate output audio data.

Figure 11C:
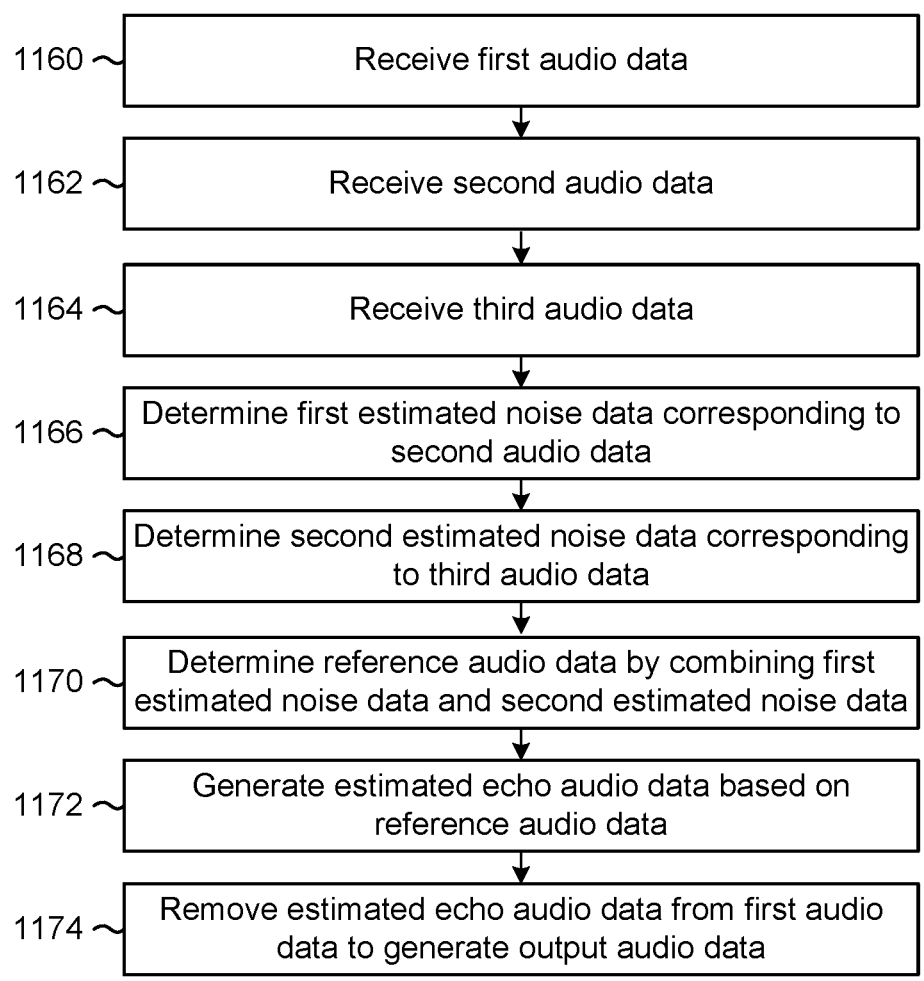

As illustrated in FIG. 11C, the device 110 may receive (1160) first audio data corresponding to a target signal (e.g., desired speech), receive (1162) second audio data corresponding to a non-target signal (e.g., undesired speech), and receive (1164) third audio data corresponding to noise. The device 110 may determine (1166) first estimated noise data corresponding to the second audio data, may determine (1168) second estimated noise data corresponding to the third audio data, and may determine (1170) reference audio data by combining the first estimated noise data and the second estimated noise data. The device 110 may then generate (1172) estimated echo audio data based on the reference audio data and remove (1174) the estimated echo audio data from the first audio data to generate output audio data.

Figure 12:
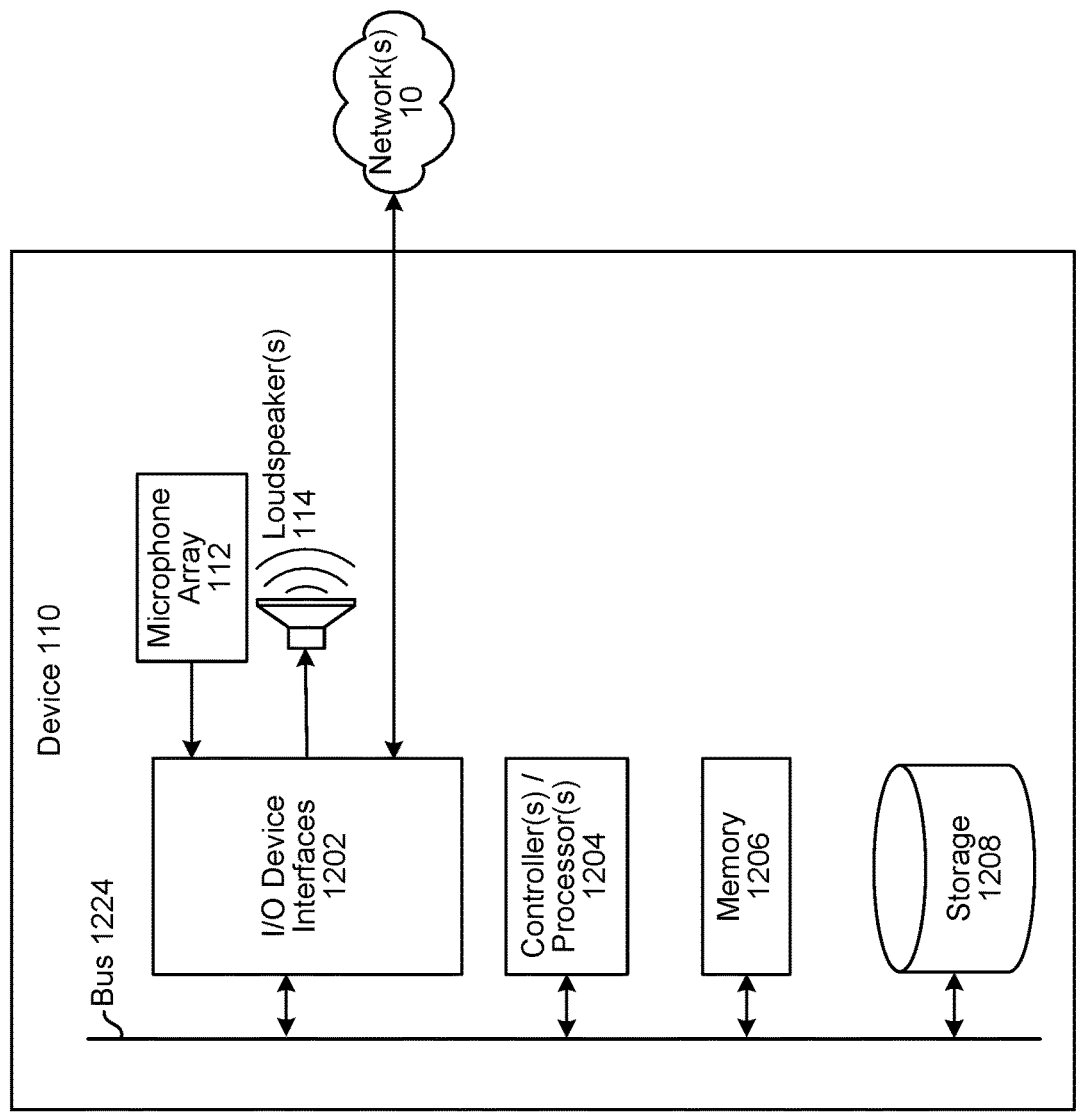
FIG. 12 is a block diagram conceptually illustrating example components of a system according to embodiments of the present disclosure.

FIG. 12 is a block diagram conceptually illustrating example components of a system for DNN beamforming according to embodiments of the present disclosure. In operation, the system 100 may include computer-readable and computer-executable instructions that reside on the device 110, as will be discussed further below.

As illustrated in FIG. 12, the device 110 may include an address/data bus 1224 for conveying data among components of the device 110. Each component within the device 110 may also be directly connected to other components in addition to (or instead of) being connected to other components across the bus 1224.

The device 110 may include one or more controllers/processors 1204, which may each include a central processing unit (CPU) for processing data and computer-readable instructions, and a memory 1206 for storing data and instructions. The memory 1206 may include volatile random access memory (RAM), non-volatile read only memory (ROM), non-volatile magnetoresistive (MRAM) and/or other types of memory. The device 110 may also include a data storage component 1208, for storing data and controller/processor-executable instructions (e.g., instructions to perform the algorithm illustrated in FIGS. 1, 7A-7B, 8, 9, 10, and/or 11A-11C). The data storage component 1208 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1202.

The device 110 includes input/output device interfaces 1202. A variety of components may be connected through the input/output device interfaces 1202. For example, the device 110 may include one or more microphone(s) included in a microphone array 112 and/or one or more loudspeaker(s) 114 that connect through the input/output device interfaces 1202, although the disclosure is not limited thereto. Instead, the number of microphone(s) and/or loudspeaker(s) 114 may vary without departing from the disclosure. In some examples, the microphone(s) and/or loudspeaker(s) 114 may be external to the device 110.

The input/output device interfaces 1202 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 1202 may also include an interface for an external peripheral device connection such as universal serial bus (USB), FireWire, Thunderbolt, Ethernet port or other connection protocol that may connect to network(s) 10. The input/output device interfaces 1202 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110 may include components that may comprise processor-executable instructions stored in storage 1208 to be executed by controller(s)/processor(s) 1204 (e.g., software, firmware, hardware, or some combination thereof). For example, components of the —Mask Estimators, Beamformers and/or Multi Channel Noise Canceller may be part of a software application running in the foreground and/or background on the device 110. Some or all of the controllers/components of the Mask Estimators, Beamformers and/or Multi Channel Noise Canceller may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Executable computer instructions for operating the device 110 and its various components may be executed by the controller(s)/processor(s) 1204, using the memory 1206 as temporary "working" storage at runtime. The executable instructions may be stored in a non-transitory manner in non-volatile memory 1206, storage 1208, or an external device. Alternatively, some or all of the executable instructions may be embedded in hardware or firmware in addition to or instead of software.

The components of the device 110, as illustrated in FIG. 12, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for beamforming, the method comprising:
    determining first audio data that includes (i) a first representation of first speech generated by a first user, (ii) a first representation of second speech generated by a second user, and (iii) a first representation of acoustic noise output by at least one loudspeaker, wherein the first audio data is in a frequency domain;
    determining, by inputting the first audio data to at least one deep neural network (DNN), first output data, the first output data indicative of the first speech being detected in at least a first frequency band and a second frequency band of the first audio data;
    determining, by inputting the first audio data to the at least one DNN, second output data, the second output data indicative of the second speech being detected in at least a third frequency band and a fourth frequency band of the first audio data, the third frequency band and the fourth frequency band being different than the first frequency band and the second frequency band;
    determining, by inputting the first audio data to the at least one DNN, third output data, the third output data indicative of the acoustic noise being detected in at least a fifth frequency band of the first audio data, the fifth frequency band being different than the first frequency band, the second frequency band, the third frequency band, and the fourth frequency band;
    generating, by a first beamformer component based on the first audio data and the first output data, second audio data corresponding to at least a first direction associated with the first speech, the second audio data including a second representation of the first speech;
    generating, by a second beamformer component based on the first audio data and the second output data, third audio data corresponding to at least a second direction associated with the second speech, the third audio data including a second representation of the second speech;
    generating, by a third beamformer component based on the first audio data and the third output data, fourth audio data corresponding to at least a third direction associated with the at least one loudspeaker, the fourth audio data including a second representation of the acoustic noise; and
    generating fifth audio data by performing acoustic echo cancellation to remove the third audio data and the fourth audio data from the second audio data, the fifth audio data including a third representation of the first speech.

2. The computer-implemented method of claim 1, wherein determining the first output data further comprises:
    determining that the first speech is detected in a first portion of the first audio data, the first portion representing audio data in the first frequency band at a first time;
    setting, in response to the first speech being detected in the first portion, a first value of the first output data equal to a first binary value;

determining that the first speech is not detected in a second portion of the first audio data, the second portion representing audio data in the third frequency band at the first time; and setting, in response to the first speech not being detected in the second portion, a second value of the first output data equal to a second binary value.

3. The computer-implemented method of claim 2, wherein determining the second output data further comprises:

determining that the acoustic noise is not detected in the first portion;

setting, in response to the acoustic noise not being detected in the first portion, a first value of the second output data equal to the second binary value;

determining that the acoustic noise is detected in the second portion; and setting, in response to the acoustic noise being detected in the second portion, a second value of the second output data equal to the first binary value.

4. The computer-implemented method of claim 1, wherein generating the second audio data further comprises:

determining a first cross-power spectral density (CPSD) matrix using the first output data;

determining a steering vector using the first CPSD matrix, the steering vector indicating at least the first direction;

determining a second CPSD matrix using an inverse of the first output data, the second CPSD matrix representing a power of the acoustic noise;

determining, using the steering vector and the second CPSD matrix, a plurality of coefficient values, a first coefficient value of the plurality of coefficient values representing a first multiplier applied, during beamforming, to audio data generated by a first microphone in a microphone array, and a second coefficient value of the plurality of coefficient values representing a second multiplier applied, during the beamforming, to audio generated by a second microphone in the microphone array;

determining a first portion of the first audio data generated by the first microphone;

generating a first portion of the second audio data by multiplying the first portion of the first audio data by the first coefficient value;

determining a second portion of the first audio data generated by the second microphone; and generating a second portion of the second audio data by multiplying the second portion of the first audio data by the second coefficient value.

5. A computer-implemented method comprising:

determining first audio data that includes (i) a first representation of speech and (ii) a first representation of acoustic noise generated by at least one noise source;

determining, using at least one deep neural network (DNN), first output data, the first output data indicative of the speech being detected in at least a first frequency band and a second frequency band of the first audio data;

determining, using the at least one DNN, second output data, the second output data indicative of the acoustic noise being detected in at least a third frequency band and a fourth frequency band of the first audio data, the third frequency band and the fourth frequency band being different than the first frequency band and the second frequency band, wherein determining the second output data further comprises:

determining that a first portion of the first audio data does not correspond to the acoustic noise, the first portion associated with a first time and the first frequency band, setting, based on determining that the first portion does not correspond to the acoustic noise, a first value of the second output data equal to a first binary value, determining that a second portion of the first audio data corresponds to the acoustic noise, the second portion associated with the first time and the third frequency band, and setting, based on determining that the second portion corresponds to the acoustic noise, a second value of the second output data equal to a second binary value;

generating, based on the first audio data and the first output data, second audio data corresponding to at least a first direction, the second audio data including a second representation of the speech; and generating, based on the first audio data and the second output data, third audio data corresponding to at least a second direction, the third audio data including a second representation of the acoustic noise.

6. The computer-implemented method of claim 5, further comprising:

generating fourth audio data by performing acoustic echo cancellation to remove at least a portion of the third audio data from the second audio data, the fourth audio data including a third representation of the speech.

7. The computer-implemented method of claim 5, wherein determining the first output data further comprises:

determining that the first portion of the first audio data corresponds to the speech;

setting a first value of the first output data equal to the second binary value, the first value of the first output data indicating that the speech is represented in the first frequency band of the first audio data at the first time;

determining that the second portion of the first audio data does not correspond to the speech; and setting a second value of the first output data equal to the first binary value, the second value of the first output data indicating that the speech is not represented in the third frequency band of the first audio data at the first time.

8. The computer-implemented method of claim 5, wherein generating the second audio data further comprises:

determining, based on the first output data, a first cross-power spectral density (CPSD) matrix;

determining a steering vector using the first CPSD matrix, the steering vector indicating at least the first direction;

determining, based on the first output data, a second CPSD matrix, the second CPSD matrix representing a power of the acoustic noise;

determining, based on the steering vector and the second CPSD matrix, first coefficient values, the first coefficient values corresponding to a linear filter used during beamforming; and generating, by a first beamforming component using the first coefficient values and the first audio data, the second audio data.

9. The computer-implemented method of claim 5, wherein generating the second audio data further comprises:

determining, based on the first output data, that the speech corresponds to at least the first direction;

determining, based on at least one of the first output data and the first direction, a plurality of coefficient values, wherein the plurality of coefficient values correspond to a linear filter used during beamforming, a first coefficient value of the plurality of coefficient values corresponding to a first microphone in a microphone array and a second coefficient value of the plurality of coefficient values corresponding to a second microphone in the microphone array;

determining a third portion of the first audio data generated by the first microphone;

generating a first portion of the second audio data by multiplying the third portion of the first audio data by the first coefficient value;

determining a fourth portion of the first audio data generated by the second microphone; and generating a second portion of the second audio data by multiplying the fourth portion of the first audio data by the second coefficient value.

10. The computer-implemented method of claim 5, further comprising:

determining, using the at least one DNN, third output data, the third output data indicative of second speech being detected in at least a fifth frequency band of the first audio data;

generating, based on the first audio data and the third output data, fourth audio data corresponding to at least a third direction, the fourth audio data including a representation of the second speech; and generating fifth audio data by performing acoustic echo cancellation to remove at least a portion of the third audio data and the fourth audio data from the second audio data, the fifth audio data including a third representation of the speech.

11. The computer-implemented method of claim 5, further comprising:

determining, using the at least one DNN, third output data, the third output data indicative of a second acoustic noise being detected in at least a fifth frequency band of the first audio data;

generating, based on the first audio data and the third output data, fourth audio data corresponding to at least a third direction, the fourth audio data including a representation of the second acoustic noise; and generating fifth audio data by performing acoustic echo cancellation to remove at least a portion of the third audio data and the fourth audio data from the second audio data, the fifth audio data including a third representation of the speech.

12. A device comprising:

at least one processor; and memory including instructions operable to be executed by the at least one processor to perform a set of actions to cause the device to:

determine first audio data that includes (i) a first representation of speech and (ii) a first representation of acoustic noise generated by at least one noise source;

determine, using at least one deep neural network (DNN), first output data, the first output data indicative of the speech being detected in at least a first frequency band and a second frequency band of the first audio data;

determine, using the at least one DNN, second output data, the second output data indicative of the acoustic noise being detected in at least a third frequency band and a fourth frequency band of the first audio data, the third frequency band and the fourth frequency band being different than the first frequency band and the second frequency band;

generate, based on the first audio data and the first output data, second audio data corresponding to at least a first direction, the second audio data including a second representation of the speech, wherein generating the second audio data further comprises:

determining, based on the first output data, that the speech corresponds to at least the first direction, determining, based on at least one of the first output data and the first direction, a plurality of coefficient values, a first coefficient value of the plurality of coefficient values corresponding to a first microphone in a microphone array and a second coefficient value of the plurality of coefficient values corresponding to a second microphone in the microphone array, determining a first portion of the first audio data generated by the first microphone, generating a first portion of the second audio data by multiplying the first portion of the first audio data by the first coefficient value, determining a second portion of the first audio data generated by the second microphone, and generating a second portion of the second audio data by multiplying the second portion of the first audio data by the second coefficient value; and generate, based on the first audio data and the second output data, third audio data corresponding to at least a second direction, the third audio data including a second representation of the acoustic noise.

13. The device of claim 12, wherein the memory further comprises instructions that, when executed by the at least one processor, further cause the computing system to:

generate fourth audio data by performing acoustic echo cancellation to remove at least a portion of the third audio data from the second audio data, the fourth audio data including a third representation of the speech.

14. The device of claim 12, wherein the memory further comprises instructions that, when executed by the at least one processor, further cause the computing system to:

determine that a third portion of the first audio data corresponds to the speech, the third portion associated with a first time and the first frequency band;

set a first value of the first output data equal to a first binary value, the first value of the first output data indicating that the speech is represented in the first frequency band of the first audio data at the first time;

determine that a fourth portion of the first audio data does not correspond to the speech, the fourth portion associated with the first time and the third frequency band; and set a second value of the first output data equal to a second binary value, the second value of the first output data indicating that the speech is not represented in the third frequency band of the first audio data at the first time.

15. The device of claim 14, wherein the memory further comprises instructions that, when executed by the at least one processor, further cause the computing system to:

determine that the third portion does not correspond to the acoustic noise;

set a first value of the second output data equal to the second binary value, the first value of the second output data indicating that the acoustic noise is not represented in the first frequency band of the first audio data at the first time;

determine that the fourth portion corresponds to the acoustic noise; and set a second value of the second output data equal to the first binary value, the second value of the second output data indicating that the acoustic noise is represented in the third frequency band of the first audio data at the first time.

16. The device of claim 12, wherein the memory further comprises instructions that, when executed by the at least one processor, further cause the computing system to:
determine, based on the first output data, a first cross-power spectral density (CPSD) matrix;
determine a steering vector using the first CPSD matrix, the steering vector indicating at least the first direction;
determine, based on the first output data, a second CPSD matrix, the second CPSD matrix representing a power of the acoustic noise;
determine, based on the steering vector and the second CPSD matrix, the plurality of coefficient values; and
generate, by a first beamforming component using the plurality of coefficient values and the first audio data, the second audio data.

17. The device of claim 12, wherein the memory further comprises instructions that, when executed by the at least one processor, further cause the computing system to:
determine, using the at least one DNN, third output data, the third output data indicative of second speech being detected in at least a fifth frequency band of the first audio data;
generate, based on the first audio data and the third output data, fourth audio data corresponding to at least a third direction, the fourth audio data including a representation of the second speech; and
generate fifth audio data by performing acoustic echo cancellation to remove at least a portion of the third audio data and the fourth audio data from the second audio data, the fifth audio data including a third representation of the speech.

18. The device of claim 12, wherein the memory further comprises instructions that, when executed by the at least one processor, further cause the computing system to:
determine, using the at least one DNN, third output data, the third output data indicative of a second acoustic noise being detected in at least a fifth frequency band of the first audio data;
generate, based on the first audio data and the third output data, fourth audio data corresponding to at least a third direction, the fourth audio data including a representation of the second acoustic noise; and
generate fifth audio data by performing acoustic echo cancellation to remove at least a portion of the third audio data and the fourth audio data from the second audio data, the fifth audio data including a third representation of the speech.

19. A computer-implemented method comprising:
determining first audio data that includes (i) a first representation of first speech, (ii) a first representation of acoustic noise generated by at least one noise source, and (iii) a first representation of second speech;
determining, using at least one deep neural network (DNN), first output data, the first output data indicative of the first speech being detected in at least a first frequency band and a second frequency band of the first audio data;
determining, using the at least one DNN, second output data, the second output data indicative of the acoustic noise being detected in at least a third frequency band and a fourth frequency band of the first audio data, the third frequency band and the fourth frequency band being different than the first frequency band and the second frequency band;
determining, using the at least one DNN, third output data, the third output data indicative of the second speech being detected in at least a fifth frequency band of the first audio data;
generating, based on the first audio data and the first output data, second audio data corresponding to at least a first direction, the second audio data including a second representation of the first speech;
generating, based on the first audio data and the second output data, third audio data corresponding to at least a second direction, the third audio data including a second representation of the acoustic noise;
generating, based on the first audio data and the third output data, fourth audio data corresponding to at least a third direction, the fourth audio data including a second representation of the second speech; and
generating fifth audio data by performing acoustic echo cancellation to remove at least a portion of the third audio data and the fourth audio data from the second audio data, the fifth audio data including a third representation of the first speech.

20. A computer-implemented method comprising:
determining first audio data that includes (i) a first representation of speech, (ii) a first representation of first acoustic noise generated by at least one first noise source, and (iii) a first representation of second acoustic noise generated by at least one second noise source;
determining, using at least one deep neural network (DNN), first output data, the first output data indicative of the speech being detected in at least a first frequency band and a second frequency band of the first audio data;
determining, using the at least one DNN, second output data, the second output data indicative of the first acoustic noise being detected in at least a third frequency band and a fourth frequency band of the first audio data, the third frequency band and the fourth frequency band being different than the first frequency band and the second frequency band;
determining, using the at least one DNN, third output data, the third output data indicative of the second acoustic noise being detected in at least a fifth frequency band of the first audio data, the fifth frequency band being different than the first frequency band and the second frequency band;
generating, based on the first audio data and the first output data, second audio data corresponding to at least a first direction, the second audio data including a second representation of the speech;
generating, based on the first audio data and the second output data, third audio data corresponding to at least a second direction, the third audio data including a second representation of the first acoustic noise;
generating, based on the first audio data and the third output data, fourth audio data corresponding to at least a third direction, the fourth audio data including a second representation of the second acoustic noise; and
generating fifth audio data by performing acoustic echo cancellation to remove at least a portion of the third audio data and the fourth audio data from the second audio data, the fifth audio data including a third representation of the speech.

* * * * *